US012701564B2

(12) United States Patent
Dimou et al.

(10) Patent No.: US 12,701,564 B2
(45) Date of Patent: Aug. 4, 2026

(54) TECHNIQUES FOR FEEDBACK DEFERRAL WITH FEEDBACK RETRANSMISSION AND CARRIER SWITCHING

(71) Applicant: QUALCOMM Incorporated, San Diego, CA (US)

(72) Inventors: Konstantinos Dimou, New York City, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 18/052,022

(22) Filed: Nov. 2, 2022

(65) Prior Publication Data

US 2023/0164763 A1 May 25, 2023

(30) Foreign Application Priority Data

Nov. 22, 2021 (GR) ............................... 20210100816

(51) Int. Cl.
*H04W 72/11* (2023.01)
*H04W 72/0446* (2023.01)
*H04W 72/20* (2023.01)

(52) U.S. Cl.
CPC ........ *H04W 72/11* (2023.01); *H04W 72/0446* (2013.01); *H04W 72/20* (2023.01)

(58) Field of Classification Search
CPC . H04W 72/11; H04W 72/0446; H04W 72/20; H04W 72/23; H04L 1/1848; H04L 1/188; H04L 1/1896; H04L 1/1854
See application file for complete search history.

(56) References Cited

U.S. PATENT DOCUMENTS

| | | | |
|---|---|---|---|
| 2019/0150180 A1* | 5/2019 | Zou ........................ | H04L 1/1812 |
| | | | 370/329 |
| 2019/0349145 A1* | 11/2019 | You ........................ | H04W 16/14 |
| 2022/0007399 A1* | 1/2022 | Rastegardoost ...... | H04L 1/1861 |
| 2025/0233695 A1 | 7/2025 | Dimou et al. | |

OTHER PUBLICATIONS

NTT Docomo, R1-2101612: Discussion on HARQ-ACK feedback enhancements for Rel. 17 URLLC #GPP TSG RAN WG1 #104-e Jan. 2021 (Year: 2021).*

* cited by examiner

*Primary Examiner* — Rina C Pancholi
(74) *Attorney, Agent, or Firm* — Holland & Hart LLP

(57) ABSTRACT

Methods, systems, and devices for wireless communication at a user equipment (UE) are described. A UE may monitor a first slot for a semi-persistent scheduled transmission associated with a target slot for feedback information for the semi-persistent scheduled transmission. The UE may also monitor for a control message during a first time period based on a scheduling conflict between uplink transmission of the feedback information and a downlink reception at the target slot. In some examples, the UE may select a second slot subsequent to the first slot for transmission of the feedback information for the semi-persistent scheduled transmission based on at least one of monitoring for the control message during the first time period or an availability of uplink resources during a second time period at least partially overlapping with the first time period. The UE may then perform a communication procedure with a network device.

24 Claims, 16 Drawing Sheets

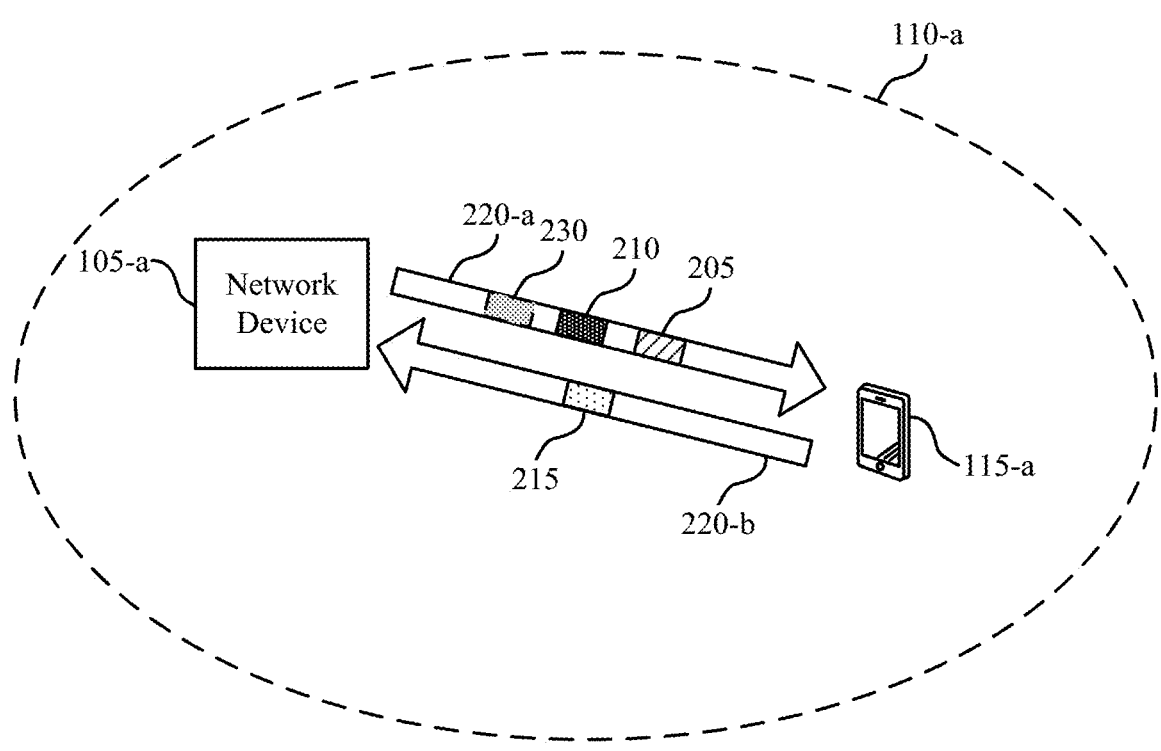
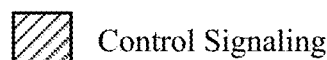 Control Signaling
Semi-persistent Scheduled
Transmission
Feedback Information
Feedback Retransmission
Control Message
FIG. 2

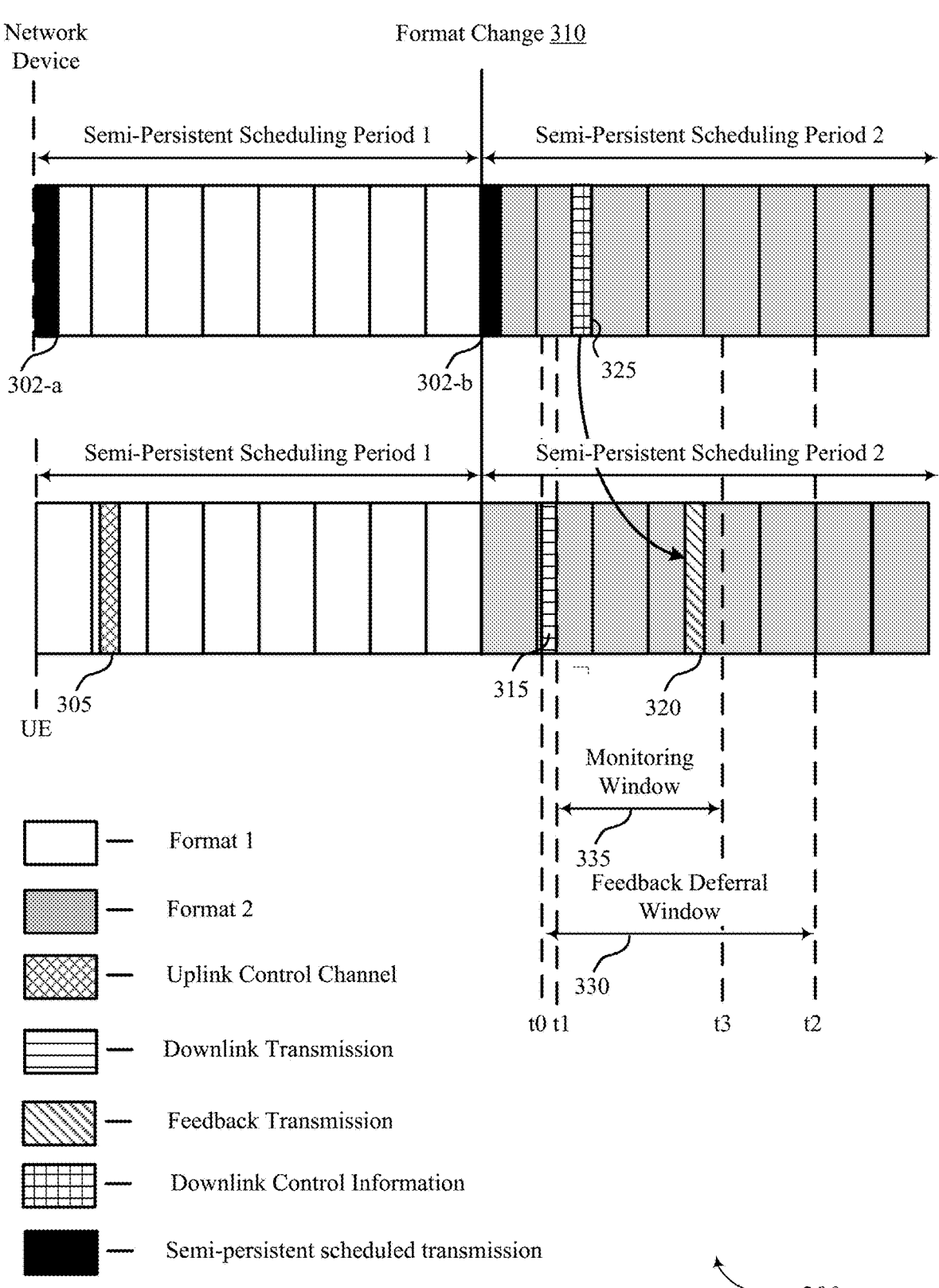

Network Device

Format Change 310

Semi-Persistent Scheduling Period 1

Semi-Persistent Scheduling Period 2

302-a 302-b

325

Semi-Persistent Scheduling Period 1

Semi-Persistent Scheduling Period 2

305

UE

315

320

Monitoring Window

335

Feedback Deferral Window

330 t0 t1 t3 t2

Format 1

Format 2

Uplink Control Channel

Downlink Transmission

Feedback Transmission

Downlink Control Information

Semi-persistent scheduled transmission

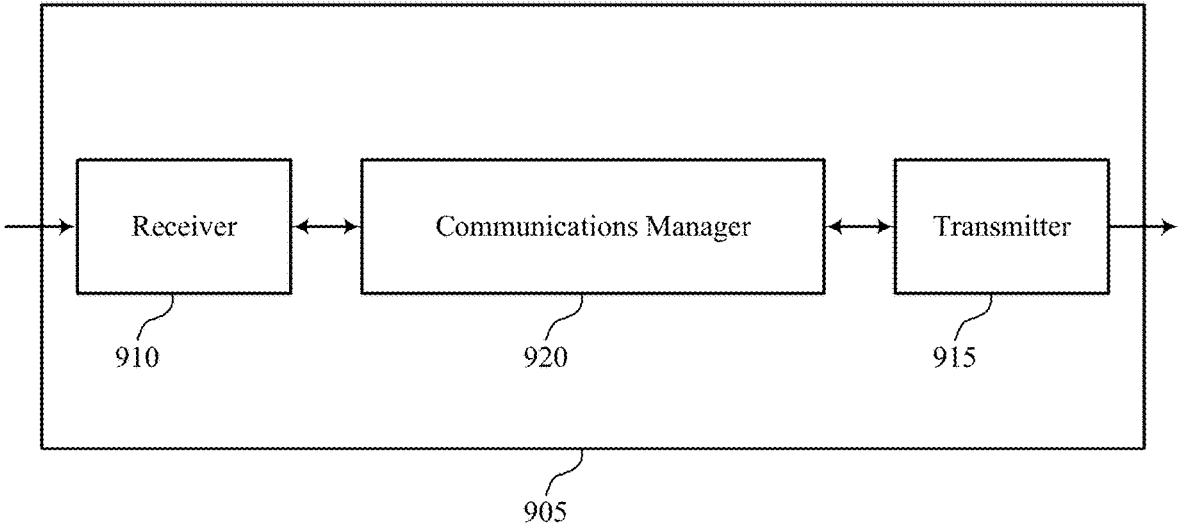
910         920         915
905
900
FIG. 9

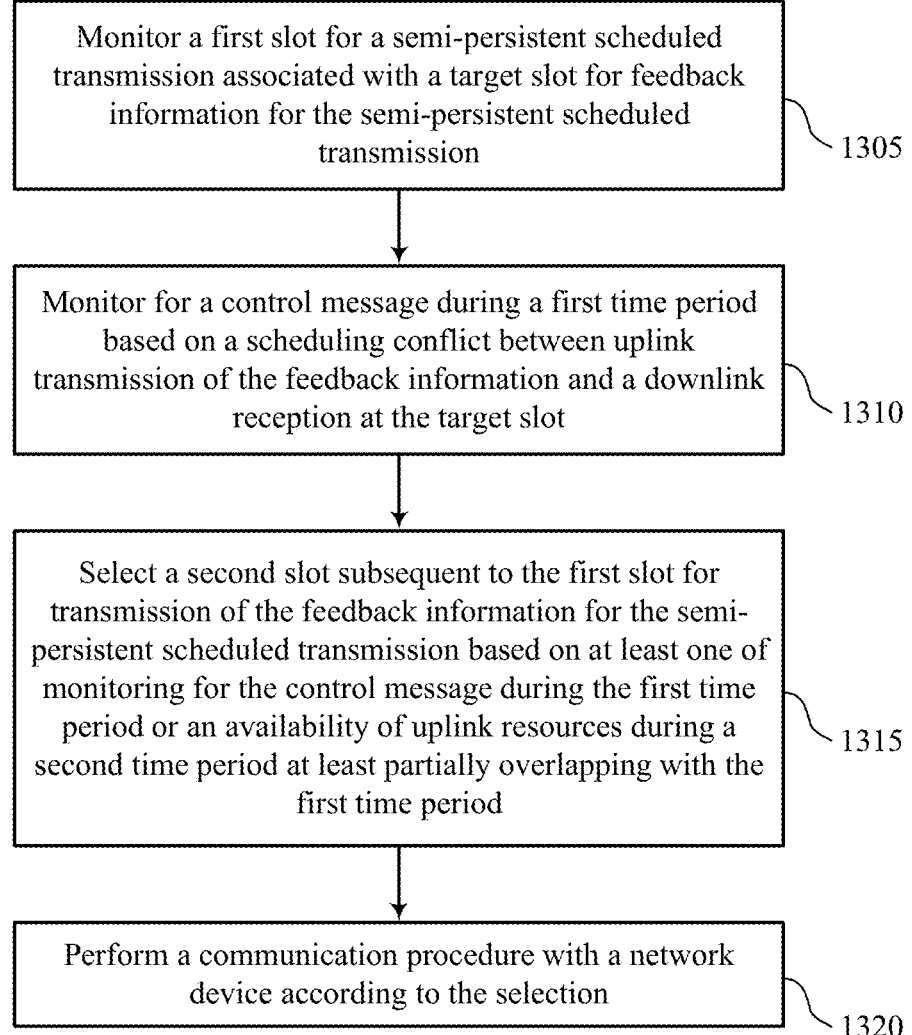

Monitor a first slot for a semi-persistent scheduled transmission associated with a target slot for feedback information for the semi-persistent scheduled transmission

1305

Monitor for a control message during a first time period based on a scheduling conflict between uplink transmission of the feedback information and a downlink reception at the target slot

1310

Select a second slot subsequent to the first slot for transmission of the feedback information for the semi-persistent scheduled transmission based on at least one of monitoring for the control message during the first time period or an availability of uplink resources during a second time period at least partially overlapping with the first time period

1315

Perform a communication procedure with a network device according to the selection

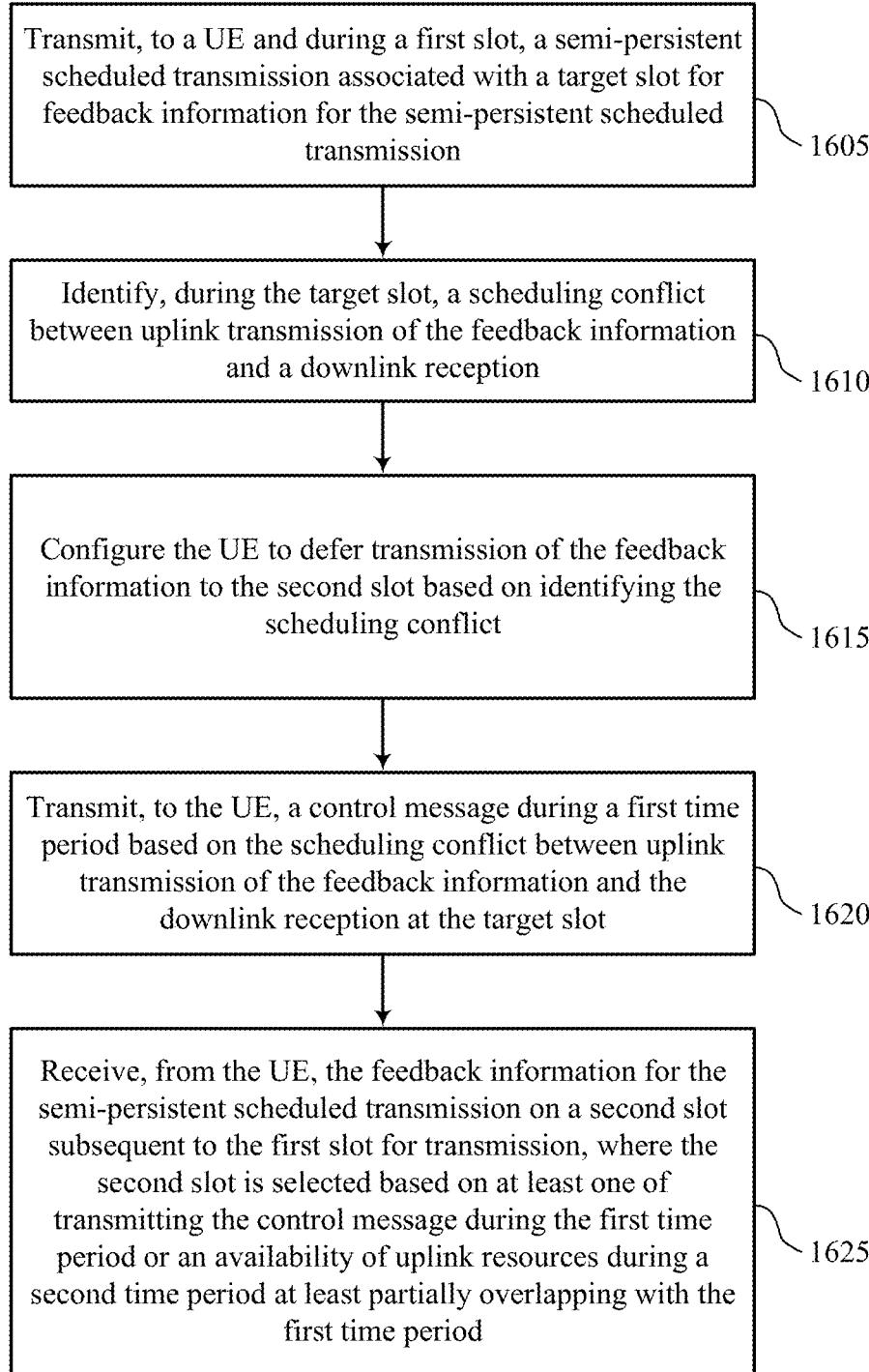

Transmit, to a UE and during a first slot, a semi-persistent scheduled transmission associated with a target slot for feedback information for the semi-persistent scheduled transmission

1605

Identify, during the target slot, a scheduling conflict between uplink transmission of the feedback information and a downlink reception

1610

Configure the UE to defer transmission of the feedback information to the second slot based on identifying the scheduling conflict

1615

Transmit, to the UE, a control message during a first time period based on the scheduling conflict between uplink transmission of the feedback information and the downlink reception at the target slot

1620

Receive, from the UE, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period

TECHNIQUES FOR FEEDBACK DEFERRAL WITH FEEDBACK RETRANSMISSION AND CARRIER SWITCHING

CROSS REFERENCE

The present application for patent claims the benefit of Greece Provisional Patent Application No. 20210100816 by DIMOU et al., entitled "TECHNIQUES FOR FEEDBACK DEFERRAL WITH FEEDBACK RETRANSMISSION AND CARRIER SWITCHING," filed Nov. 22, 2021, assigned to the assignee hereof, and expressly incorporated by reference herein.

FIELD OF TECHNOLOGY

The following relates to wireless communication at a user equipment (UE), including techniques for feedback deferral with feedback retransmission and carrier switching.

BACKGROUND

Wireless communications systems may be widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network devices or one or more network access nodes, each simultaneously supporting communication for multiple communication devices, which may be otherwise known as user equipment (UE). In some wireless communications systems, a network device may configure UEs for feedback transmission. However, in some examples, feedback transmission techniques may be deficient.

SUMMARY

The described techniques relate to improved methods, systems, devices, and apparatuses that support techniques for feedback deferral with feedback retransmission and carrier switching. Generally, the described techniques provide for a method for feedback transmission in case of a conflict between a symbol period allocated for feedback transmission for a semi-persistent scheduled downlink transmission and for downlink reception. In particular, according to aspects herein, a user equipment (UE) may defer the feedback transmission in accordance with a feedback deferral technique in conjunction with a feedback retransmission technique. In some examples, the UE may receive a semi-persistent scheduled downlink transmission. The UE may identify a conflict for a symbol period between uplink transmission of feedback for a first semi-persistent scheduled downlink transmission and downlink reception. In such cases, the UE may defer the transmission of feedback information for the semi-persistent scheduled downlink transmission. In some examples, the UE may monitor for control message during a time period following the conflict. The UE may then select a slot for transmitting the feedback information based on the feedback deferral technique and monitoring for the control message.

A method for wireless communication at a UE is described. The method may include monitoring a first slot for a semi-persistent scheduled transmission associated with a target slot for feedback information for the semi-persistent scheduled transmission, monitoring for a control message during a first time period based on a scheduling conflict between uplink transmission of the feedback information and a downlink reception at the target slot, selecting a second slot subsequent to the first slot for transmission of the feedback information for the semi-persistent scheduled transmission based on at least one of monitoring for the control message during the first time period or an availability of uplink resources during a second time period at least partially overlapping with the first time period, and performing a communication procedure with a network device according to the selection.

An apparatus for wireless communication at a UE is described. The apparatus may include a processor, and a memory coupled with the processor where the memory includes instructions. The instructions may be executable by the processor to cause the apparatus to monitor a first slot for a semi-persistent scheduled transmission associated with a target slot for feedback information for the semi-persistent scheduled transmission, monitor for a control message during a first time period based on a scheduling conflict between uplink transmission of the feedback information and a downlink reception at the target slot, select a second slot subsequent to the first slot for transmission of the feedback information for the semi-persistent scheduled transmission based on at least one of monitoring for the control message during the first time period or an availability of uplink resources during a second time period at least partially overlapping with the first time period, and perform a communication procedure with a network device according to the selection.

Another apparatus for wireless communication at a UE is described. The apparatus may include means for monitoring a first slot for a semi-persistent scheduled transmission associated with a target slot for feedback information for the semi-persistent scheduled transmission, means for monitoring for a control message during a first time period based on a scheduling conflict between uplink transmission of the feedback information and a downlink reception at the target slot, means for selecting a second slot subsequent to the first slot for transmission of the feedback information for the semi-persistent scheduled transmission based on at least one of monitoring for the control message during the first time period or an availability of uplink resources during a second time period at least partially overlapping with the first time period, and means for performing a communication procedure with a network device according to the selection.

A non-transitory computer-readable medium storing code for wireless communication at a UE is described. The code may include instructions executable by a processor to monitor a first slot for a semi-persistent scheduled transmission associated with a target slot for feedback information for the semi-persistent scheduled transmission, monitor for a control message during a first time period based on a scheduling conflict between uplink transmission of the feedback information and a downlink reception at the target slot, select a second slot subsequent to the first slot for transmission of the feedback information for the semi-persistent scheduled transmission based on at least one of monitoring for the control message during the first time period or an availability of uplink resources during a second time period at least partially overlapping with the first time period, and perform a communication procedure with a network device according to the selection.

In some examples of the method, apparatuses, and non-transitory computer-readable medium described herein, performing the communication procedure may include operations, features, means, or instructions for transmitting, to the network device, the feedback information including at least feedback for the semi-persistent scheduled transmission on the second slot according to the selection. Some examples of the method, apparatuses, and non-transitory computer-readable medium described herein may further include operations, features, means, or instructions for receiving the semi-persistent scheduled transmission in the first slot and initiating a first timer based on receiving the semi-persistent scheduled transmission, where the first timer may be configured to expire upon termination of the second time period.

Some examples of the method, apparatuses, and non-transitory computer-readable medium described herein may further include operations, features, means, or instructions for initiating a second timer in response to initiating the first timer, where monitoring the control message may be based on initiating the second timer. Some examples of the method, apparatuses, and non-transitory computer-readable medium described herein may further include operations, features, means, or instructions for receiving, during the first time period and after initiating the second timer, the control message requesting one or more feedback bits, where selecting the second slot may be based on the control message.

Some examples of the method, apparatuses, and non-transitory computer-readable medium described herein may further include operations, features, means, or instructions for transmitting, to the network device, one or more requested feedback bits on the second slot in accordance with the selecting. In some examples of the method, apparatuses, and non-transitory computer-readable medium described herein, the second timer may be configured to expire upon termination of the first time period.

Some examples of the method, apparatuses, and non-transitory computer-readable medium described herein may further include operations, features, means, or instructions for determining that the control message may be not received during the first time period. Some examples of the method, apparatuses, and non-transitory computer-readable medium described herein may further include operations, features, means, or instructions for determining a termination of the second time period and dropping the feedback information for the semi-persistent scheduled transmission based on determining the termination of the second time period.

Some examples of the method, apparatuses, and non-transitory computer-readable medium described herein may further include operations, features, means, or instructions for identifying, during the target slot, the scheduling conflict between uplink transmission of the feedback information and the downlink reception and deferring transmission of the feedback information to the second slot based on identifying the scheduling conflict, where selecting the second slot may be based on deferring the transmission. Some examples of the method, apparatuses, and non-transitory computer-readable medium described herein may further include operations, features, means, or instructions for determining that carrier switching may be enabled at the UE, where selecting the second slot includes selecting the second slot in accordance with an availability of uplink resources on a set of multiple serving cells during the target slot.

Some examples of the method, apparatuses, and non-transitory computer-readable medium described herein may further include operations, features, means, or instructions for identifying a maximum deferral value associated with the feedback information for the semi-persistent scheduled transmission, where the second time period may be based on the maximum deferral value.

In some examples of the method, apparatuses, and non-transitory computer-readable medium described herein, the control message includes a control message for a feedback codebook or a control message for one-shot feedback retransmission or a control message for feedback codebook retransmission or a control message for switching an uplink control channel carrier.

A method for wireless communication at a network device is described. The method may include transmitting, to a UE and during a first slot, a semi-persistent scheduled transmission associated with a target slot for feedback information for the semi-persistent scheduled transmission, transmitting, to the UE, a control message during a first time period based on a scheduling conflict between uplink transmission of the feedback information and a downlink reception at the target slot, and receiving, from the UE, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period.

An apparatus for wireless communication at a network device is described. The apparatus may include a processor, and a memory coupled with the processor where the memory includes instructions. The instructions may be executable by the processor to cause the apparatus to transmit, to a UE and during a first slot, a semi-persistent scheduled transmission associated with a target slot for feedback information for the semi-persistent scheduled transmission, transmit, to the UE, a control message during a first time period based on a scheduling conflict between uplink transmission of the feedback information and a downlink reception at the target slot, and receive, from the UE, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period.

Another apparatus for wireless communication at a network device is described. The apparatus may include means for transmitting, to a UE and during a first slot, a semi-persistent scheduled transmission associated with a target slot for feedback information for the semi-persistent scheduled transmission, means for transmitting, to the UE, a control message during a first time period based on a scheduling conflict between uplink transmission of the feedback information and a downlink reception at the target slot, and means for receiving, from the UE, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period.

A non-transitory computer-readable medium storing code for wireless communication at a network device is described. The code may include instructions executable by a processor to transmit, to a UE and during a first slot, a semi-persistent scheduled transmission associated with a target slot for feedback information for the semi-persistent scheduled transmission, transmit, to the UE, a control message during a first time period based on a scheduling conflict between uplink transmission of the feedback information and a downlink reception at the target slot, and receive, from the UE, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period.

Some examples of the method, apparatuses, and non-transitory computer-readable medium described herein may further include operations, features, means, or instructions for configuring the UE to initiate a first timer based on transmitting the semi-persistent scheduled transmission, where the first timer may be configured to expire upon termination of the second time period. Some examples of the method, apparatuses, and non-transitory computer-readable medium described herein may further include operations, features, means, or instructions for configuring the UE to initiate a second timer in response to initiating the first timer, where transmitting the control message may be based on initiating the second timer.

In some examples of the method, apparatuses, and non-transitory computer-readable medium described herein, transmitting the control message may include operations, features, means, or instructions for transmitting, during the first time period and after initiating the second timer, the control message requesting one or more feedback bits, where the second slot may be selected based on the control message. Some examples of the method, apparatuses, and non-transitory computer-readable medium described herein may further include operations, features, means, or instructions for receiving, from the UE, one or more requested feedback bits on the second slot in accordance with the selecting. In some examples of the method, apparatuses, and non-transitory computer-readable medium described herein, the second timer may be configured to expire upon termination of the first time period.

Some examples of the method, apparatuses, and non-transitory computer-readable medium described herein may further include operations, features, means, or instructions for identifying, during the target slot, the scheduling conflict between uplink transmission of the feedback information and the downlink reception and configuring the UE to defer transmission of the feedback information to the second slot based on identifying the scheduling conflict, where the second slot may be selected based on deferring the transmission. Some examples of the method, apparatuses, and non-transitory computer-readable medium described herein may further include operations, features, means, or instructions for determining that carrier switching may be enabled at the UE, where the second slot may be selected in accordance with an availability of uplink resources on a set of multiple serving cells during the target slot.

Some examples of the method, apparatuses, and non-transitory computer-readable medium described herein may further include operations, features, means, or instructions for identifying a maximum deferral value associated with the feedback information for the semi-persistent scheduled transmission, where the second time period may be based on the maximum deferral value. In some examples of the method, apparatuses, and non-transitory computer-readable medium described herein, the control message includes a control message for a feedback codebook or a control message for one-shot feedback retransmission or a control message for feedback codebook retransmission or a control message for switching an uplink control channel carrier.

BRIEF DESCRIPTION OF THE DRAWINGS

FIG. 2 illustrates an example of a wireless communications system that supports techniques for feedback deferral with feedback retransmission and carrier switching in accordance with aspects of the present disclosure.

FIG. 3 illustrates an example of a feedback transmission procedure that supports techniques for feedback deferral with feedback retransmission and carrier switching in accordance with aspects of the present disclosure.

FIGS. 9 and 10 show block diagrams of devices that support techniques for feedback deferral with feedback retransmission and carrier switching in accordance with aspects of the present disclosure.

FIGS. 13 through 16 show flowcharts illustrating methods that support techniques for feedback deferral with feedback retransmission and carrier switching in accordance with aspects of the present disclosure.

DETAILED DESCRIPTION

Figure 1:
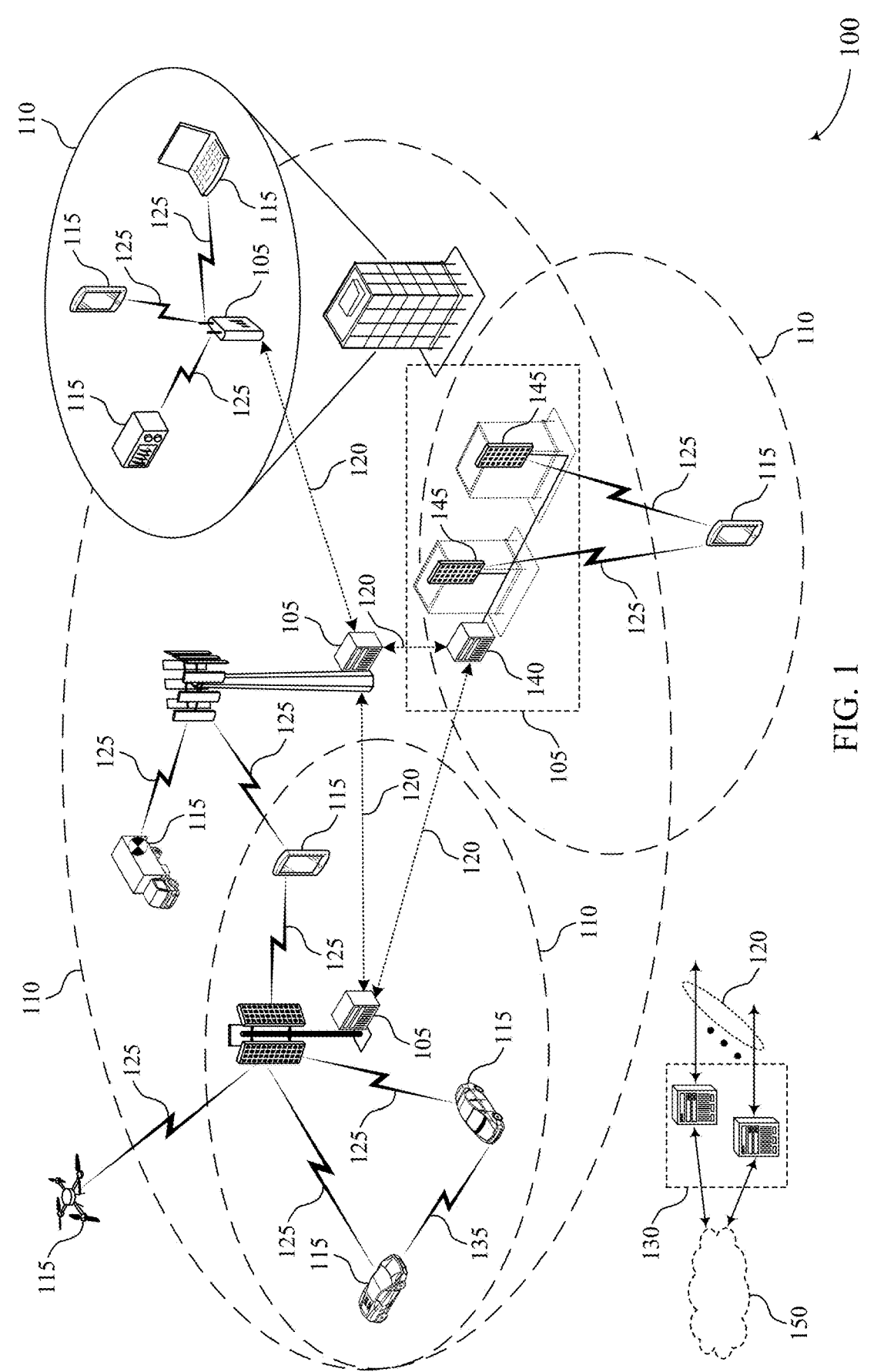
FIG. 1 illustrates an example of a wireless communications system that supports techniques for feedback deferral with feedback retransmission and carrier switching in accordance with aspects of the present disclosure.

In wireless communications systems, a user equipment (UE) may be configured with resources for receiving semi-persistent scheduled downlink transmissions. According to a first type of radio allocation format, the UE may receive a semi-persistent scheduled downlink transmission and may transmit feedback on one or more uplink symbols after receiving the semi-persistent scheduled downlink transmission. In some examples, a network device may transmit an indication to change a radio allocation format (e.g., transmission time interval (TTI) format). Upon receiving the indication to change the radio allocation format, the UE may identify a conflict between a symbol period allocated for feedback transmission for a semi-persistent scheduled downlink transmission and for downlink reception. In some examples, a first radio allocation format may support a first number of downlink symbols, flexible symbols and uplink symbols, and a second radio allocation format may support a second number of downlink symbols, flexible symbols and uplink symbols.

If the UE receives an indication to switch from the first radio allocation format to the second radio allocation format, the UE may determine that the symbol used for feedback transmission in the first radio allocation format changes to a downlink symbol in the second radio allocation format. In some examples, the UE may defer the feedback transmission due to the conflict resulting from the radio allocation format change and may utilize a first available control channel in the second radio allocation format for transmitting the deferred feedback. In addition, the UE may receive a control message requesting a one-shot feedback (a feedback retransmission request). The UE may utilize the techniques depicted herein for joint operation of semi-persistent scheduled feedback reporting and reception of the control message requesting the one-shot feedback.

To reduce semi-persistent scheduled feedback reporting latency, the network device may configure the UE to defer the semi-persistent scheduled feedback on a different slot if there is a conflict between the semi-persistent scheduled feedback and a downlink transmission. According to aspects depicted herein, the UE may monitor for the control message for a time period after the deferral of the semi-persistent scheduled feedback. For example, the UE may monitor for a semi-persistent scheduled transmission in a first slot and may then monitor for the control message during a time period following the semi-persistent scheduled transmission. The UE may select a second slot for transmitting the semi-persistent scheduled feedback based on deferring the semi-persistent scheduled feedback and monitoring for the control message. If the UE receives the control message prior to expiration of the monitoring period, then the UE transmits the semi-persistent scheduled feedback according to the control message. In this case, the UE may stop searching for a first available uplink resource. In addition, the UE may stop the timer for monitoring the control information. On the other hand, if no control message is received, then the UE may defer the semi-persistent scheduled feedback transmission up to a deferral period.

Particular aspects of the subject matter described herein may be implemented to realize one or more advantages. The described techniques may support improvements in feedback transmission in wireless communications systems by increasing coverage and reducing signaling overhead. Further, in some examples, the feedback transmission configuration as described herein may support higher data rates and diversity for control and data, thereby improving latency and reliability. As such, supported techniques may include improved network operations, and, in some examples, may promote network efficiencies, among other benefits.

Aspects of the disclosure are initially described in the context of wireless communications systems. Aspects of the disclosure are further described in the context of feedback transmission procedure and process flow. Aspects of the disclosure are further illustrated by and described with reference to apparatus diagrams, system diagrams, and flowcharts that relate to techniques for feedback deferral with feedback retransmission and carrier switching.

FIG. 1 illustrates an example of a wireless communications system 100 that supports techniques for feedback deferral with feedback retransmission and carrier switching in accordance with aspects of the present disclosure. The wireless communications system 100 may include one or more network devices 105, one or more UEs 115, and a core network 130. In some cases, a network device 105 may be an example of a base station. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network devices 105 may be dispersed throughout a geographic area to form the wireless communications system 100 and may be devices in different forms or having different capabilities. The network devices 105 and the UEs 115 may wirelessly communicate via one or more communication links 125. Each network device 105 may provide a coverage area 110 over which the UEs 115 and the network device 105 may establish one or more communication links 125. The coverage area 110 may be an example of a geographic area over which a network device 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network devices 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, a network device 105, entity of a core network 130, apparatus, device, or computing system configured to perform any techniques described herein. For example, a network node may be a UE 115. As another example, a network node may be a base station or a network device 105. As another example, a first network node may be configured to communicate with a second network node or a third network node. In one aspect of this example, the first network node may be a UE 115, the second network node may be a network device 105, and the third network node may be a UE 115. In another aspect of this example, the first network node may be a UE 115, the second network node may be a network device 105, and the third network node may be a network device 105. In yet other aspects of this example, the first, second, and third network nodes may be different. Similarly, reference to a UE 115, a network device 105, an apparatus, a device, or a computing system may include disclosure of the UE 115, network device 105, apparatus, device, or computing system being a network node. For example, disclosure that a UE 115 may be configured to receive information from a network device 105 also discloses that a first network node is configured to receive information from a second network node. In this example, consistent with this disclosure, the first network node may refer to a first UE 115, a first network device 105, a first apparatus, a first device, or a first computing system configured to receive the information; and the second network node may refer to a second UE 115, a second network device 105, a second apparatus, a second device, or a second computing system The network devices 105 may communicate with the core network 130, or with one another, or both. For example, the network devices 105 may interface with the core network 130 through one or more backhaul links 120 (e.g., via an S1, N2, N3, or other interface). The network devices 105 may communicate with one another over the backhaul links 120 (e.g., via an X2, Xn, or other interface) either directly (e.g., directly between network devices 105), or indirectly (e.g., via core network 130), or both. In some examples, the backhaul links 120 may be or include one or more wireless links.

One or more of the network devices 105 described herein may include or may be referred to by a person having ordinary skill in the art as a base transceiver station, a radio network device, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network devices 105 and the network equipment including macro eNBs or gNBs, small cell eNBs or gNBs, or relay network devices 105, among other examples, as shown in FIG. 1.

The UEs 115 and the network devices 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network device 105, or downlink transmissions from a network device 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the network devices 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A macro cell generally covers a relatively large geographic area (e.g., several kilometers in radius) and may allow unrestricted access by the UEs 115 with service subscriptions with the network provider supporting the macro cell. A small cell may be associated with a lower-powered network device 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network device 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network device 105 may be movable and therefore provide communication coverage for a moving geographic coverage area 110. In some examples, different geographic coverage areas 110 associated with different technologies may overlap, but the different geographic coverage areas 110 may be supported by the same network device 105. In other examples, the overlapping geographic coverage areas 110 associated with different technologies may be supported by different network devices 105. The wireless communications system 100 may include, for example, a heterogeneous network in which different types of the network devices 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network device 105. Other UEs 115 in such a group may be outside the geographic coverage area 110 of a network device 105 or be otherwise unable to receive transmissions from a network device 105. In some examples, groups of the UEs 115 communicating via D2D communications may utilize a one-to-many (1:M) system in which each UE 115 transmits to every other UE 115 in the group. In some examples, a network device 105 facilitates the scheduling of resources for D2D communications. In other cases, D2D communications are carried out between the UEs 115 without the involvement of a network device 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network devices 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices 105, such as a base station, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network device 105 may be distributed across various network devices (e.g., radio heads and ANCs) or consolidated into a single network device (e.g., a network device 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network devices 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network device 105 or a UE 115 may be equipped with multiple antennas, which may be used to employ techniques such as transmit diversity, receive diversity, multiple-input multiple-output (MIMO) communications, or beamforming. The antennas of a network device 105 or a UE 115 may be located within one or more antenna arrays or antenna panels, which may support MIMO operations or transmit or receive beamforming. For example, one or more network device antennas or antenna arrays may be co-located at an antenna assembly, such as an antenna tower. In some examples, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network device 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network device 105 or a UE 115 may use beam sweeping techniques as part of beam forming operations. For example, a network device 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network device 105 multiple times in different directions. For example, the network device 105 may transmit a signal according to different beamforming weight sets associated with different directions of transmission. Transmissions in different beam directions may be used to identify (e.g., by a transmitting device, such as a network device 105, or by a receiving device, such as a UE 115) a beam direction for later transmission or reception by the network device 105.

Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network device 105 in different directions and may report to the network device 105 an indication of the signal that the UE 115 received with a highest signal quality or an otherwise acceptable signal quality.

In some examples, transmissions by a device (e.g., by a network device 105 or a UE 115) may be performed using multiple beam directions, and the device may use a combination of digital precoding or radio frequency beamforming to generate a combined beam for transmission (e.g., from a network device 105 to a UE 115). The UE 115 may report feedback that indicates precoding weights for one or more beam directions, and the feedback may correspond to a configured number of beams across a system bandwidth or one or more sub-bands. The network device 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network device 105 or a core network 130 supporting radio bearers for user plane data. At the physical layer, transport channels may be mapped to physical channels.

The UEs 115 and the network devices 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may monitor a first slot for a semi-persistent scheduled transmission associated with a target slot for feedback information for the semi-persistent scheduled transmission. The UE 115 may also monitor for a control message during a first time period based on a scheduling conflict between uplink transmission of the feedback information and a downlink reception at the target slot. In some examples, the UE 115 may select a second slot subsequent to the first slot for transmission of the feedback information for the semi-persistent scheduled transmission based on at least one of monitoring for the control message during the first time period or an availability of uplink resources during a second time period at least partially overlapping with the first time period. According to the selection, the UE 115 may perform a communication procedure with a network device 105.

FIG. 2 illustrates an example of a wireless communications system 200 that supports techniques for feedback deferral with feedback retransmission and carrier switching in accordance with aspects of the present disclosure. In some examples, the wireless communications system 200 may implement or be implemented by aspects of the wireless communications system 100. For example, the wireless communications system 200 may include a UE 115-*a* and a network device 105-*a*, which may be examples of a UE 115 and a network device 105 as described with reference to FIG. 1. The UE 115-*a* and the network device 105-*a* may communicate over a communication link 220-*a* (e.g., a downlink) and a communication link 220-*b* (e.g., an uplink), which may be examples of a communication link 125 described with reference to FIG. 1. The UE 115-*a* and the network device 105-*a* may communicate within a geographic coverage area 110-*a* of the network device 105-*a*, which may be an example of a geographic coverage area 110 described with reference to FIG. 1.

In the wireless communications system 200, the UE 115-*a* may use semi-persistent scheduled feedback deferral techniques in conjunction with carrier switching and feedback retransmission techniques to transmit feedback information 215 to the network device 105-*a*. Using semi-persistent scheduled feedback deferral, according to the techniques depicted herein, the UE 115-*a* may be able to transmit the feedback information 215 to the network device 105-*a* with reduced latency and increased efficiency, among other benefits.

In some wireless communications systems, a UE 115-*a* may be configured with (via a control message transmitted from the network device 105-*a*) resources for receiving semi-persistent scheduled downlink transmissions 210. According to a first type of slot format (e.g., a radio allocation format), the UE 115-*a* may transmit feedback on one or more uplink symbols after receiving the semi-persistent scheduled transmission 210. A network device 105-*a* may transmit an indication (via a control message) to change the slot format. In some cases, the UE 115-*a* may identify a conflict between a symbol period allocated for feedback transmission for a semi-persistent scheduled transmission 210 and for downlink reception based on the change to the slot format. For example, a slot format 42 may support three downlink symbols, three flexible symbols and eight uplink symbols, and a slot format 33 may support nine downlink symbols, three flexible symbols and two uplink symbols. If the UE 115-*a* receives an indication to switch from slot format 42 to slot format 33, the UE 115-*a* may determine that the symbol allocated for feedback transmission in slot format 42 is a downlink symbol in slot format 33. In some examples, the UE 115-*a* may defer the feedback transmission (e.g., semi-persistent scheduled ACK/NACK information) and may utilize a first available control channel for transmitting the deferred feedback. Thus, deferring feedback may increase the latency and the network device 105-*a* may be unable to efficiently process uplink transmissions (deferred feedback and/or uplink data). In addition, the network device 105-*a* may transmit a control message requesting a one-shot feedback adding further complexity to the UE 115-*a* operations.

According to the one or more aspects of the present disclosure, the UE 115-*a* and the network device 1105-*a* may communicate according to techniques for joint operation of semi-persistent scheduled feedback reporting and reception of the control message requesting the one-shot feedback. In the wireless communications system 200, the network device 105-*a* may transmit control signaling 205 to the UE 115-*a*. The control signaling 205 may include a radio resource control signaling, dynamic signaling (e.g., downlink control information (downlink control information), MAC control elements (CEs)), or both. The control signaling 205 may schedule the semi-persistent scheduled transmission 210 from the network device 105-*a* to the UE 115-*a* in a first slot. In some cases, the control signaling 205 may also configure the UE 115-*a* to transmit feedback information 215 for the semi-persistent scheduled transmission 210 in a target slot. In some cases, however, the UE 115-*a* may be unable to transmit the feedback information 215 in the target slot. For example, there may be a scheduling conflict with the target slot that prevents the UE 115-*a* from transmitting the feedback information 215 in the target slot. In accordance with aspects of the present disclosure, the UE 115-*a* may use carrier switching and feedback retransmission in conjunction with semi-persistent scheduled feedback deferral techniques to transmit the feedback information 215 in a slot with available uplink resources.

As depicted herein, the UE 115-*a* may be configured by the network device 105-*a* to transmit feedback to the network device 105-*a* using a deferred feedback transmission scheme. In some cases, the network device 105-*a* may transmit a control signal configuring resources for receiving downlink transmissions via the communications link 220-*a*. Additionally or alternatively, the network device 105-*a* may transmit a set of downlink transmissions via the communications link 220-*a*, where the downlink transmissions may include semi-persistent scheduled transmissions 210. In response to receiving the control signal and the downlink transmissions, the UE 115-*a* may transmit an uplink transmission (e.g., deferred feedback) to the network device 105-*a*. In some case, the uplink transmission may include embedded feedback information (e.g., acknowledgement or negative acknowledgement (ACK/NACK) feedback) for the semi-persistent scheduled transmissions 210 received by the UE 115-*a*. In one example, the UE 115-*a* may append the one or more feedback bits (e.g., semi-persistent scheduled ACK/NACK information) to the one or more bits of uplink data.

The UE 115-*a* may monitor a first slot for a semi-persistent scheduled transmission 210 associated with a target slot for feedback information for the semi-persistent scheduled transmission 210. In some examples, the UE 115-*a* may monitor for a feedback retransmission control message 230 during a first time period based on a scheduling conflict between uplink transmission of the feedback information and a downlink reception at the target slot. Upon receiving the semi-persistent scheduled transmission 210, the UE 115-*a* may subsequently determine a conflict for a symbol period between uplink transmission of feedback for the semi-persistent scheduled transmission 210 and downlink reception. In such scenarios, the UE 115-*a* may choose to defer the feedback information 215 (e.g., semi-persistent scheduled ACK/NACK information) to a first available uplink control channel in accordance with a feedback deferral timer and reception of the control message 230.

In some examples, the UE 115-*a* may select a second slot subsequent to the first slot for transmission of the feedback information for the semi-persistent scheduled transmission 210 based on at least one of monitoring for the feedback retransmission control message 230 during the first time period or an availability of uplink resources during a second time period at least partially overlapping with the first time period. For example, the UE 115-*a* may identify a target slot for transmission of the feedback information 215 (e.g., HARQ ACK or NACK feedback). In some cases, the UE 115-*a* may identify the target slot based on a timing offset (e.g., K1) associated with the semi-persistent scheduled transmission 210. In some examples, the control signaling 205 may include an indication of the timing offset, the first reference numerology, or both.

Aspects of the present disclosure provides for the UE 115-*a* to defer the feedback transmission until a control message is received or the feedback deferral window expires instead of continuing to defer the feedback transmission (which may potentially increase the latency). In some examples, the UE initiate a first timer based on receiving the semi-persistent scheduled transmission 210. The first timer (feedback deferral timer) may be configured to expire upon termination of a feedback deferral time window. Upon receiving the semi-persistent scheduled transmission 210, the UE 115-*a* may initiate a second timer. For example, the UE 115-*a* start a second timer (timer_1shot HARQ feedback for canceled HARQ), defining the period over which the UE 115-*a* may monitor for the feedback retransmission control message 230 (e.g., the control message used by the network device 105-*a* to request a one-shot feedback). In some examples, the UE 115-*a* may initiate a feedback deferral at time instant t0 and start the second timer (timer_1shot HARQ feedback for canceled HARQ) at time instant t1. In some examples, the second timer may end at time instant t3. The second timer may be equal to a maximum deferral time. Thus, the UE 115-*a* may monitor for the feedback retransmission control message 230 between time instant t1 and time instant t3.

In some instances, the UE 115-*a* may identify a target slot for transmission of the feedback information 215 for the semi-persistent scheduled transmission 210. During the target slot, the UE 115-*a* may identify a scheduling conflict between uplink transmission of the feedback information 215 and the downlink reception. In such cases, the UE 115-*a* attempts to transmit all deferred feedback bits at the first available physical uplink control channel resource. If the UE 115-*a* finds a first available physical uplink control channel resource before time instant t3, then the second timer (timer_1shot HARQ feedback for canceled HARQ) stops and the UE 115-*a* transmits the feedback information 215. On the other hand, the UE 115-*a* may receive the feedback retransmission control message 230 with a request for a one-shot feedback transmission prior to time instant t3. In such cases, the UE 115-*a* may follow the indication in the feedback retransmission control message 230 and may transmit the requested feedback bits (i.e., the feedback bits requested by the network device 105-*a* using the feedback retransmission control message 230).

In some examples, the second timer for monitoring the feedback retransmission control message 230 may expire at time instant t3 without the UE 115-*a* having found a first available physical uplink control channel resource and having received any control message 230 from the network device 105-*a*. For instance, the UE 115-*a* may determine a termination of the second time period. Additionally or alternatively, the UE 115-*a* may determine that the UE 115-*a* have not selected a physical uplink control channel resource for feedback transmission. In such cases, the UE 115-*a* may attempt to transmit deferred bits in first available physical uplink control channel resource prior to the expiration of the a given (e.g., maximum) deferral time (e.g., expiry of the first timer). Additionally or alternatively, the UE 115-*a* may drop the feedback information 215 for the semi-persistent scheduled transmission 210 when a given (e.g. maximum) deferral time is reached.

Techniques depicted herein may be used for at least one of joint operation of semi-persistent scheduled feedback deferral and triggered feedback code block retransmission, joint operation of semi-persistent scheduled feedback deferral and carrier switching, joint operation of semi-persistent scheduled feedback deferral and reception of control message allocating feedback associated with dynamic grant or uplink shared channel associated with a dynamic grant to the UE, or a combination thereof. In some cases, and the allocation of feedback associated with dynamic grant or uplink shared channel associated with a dynamic grant may be used for a payload and the deferred feedback.

FIG. 3 illustrates an example of a feedback transmission procedure 300 that supports techniques for feedback deferral with feedback retransmission and carrier switching in accordance with aspects of the present disclosure. In some examples, the feedback transmission procedure 300 may implement aspects of wireless communications system 100 and the wireless communications system 200 as depicted with reference to FIGS. 1 and 2. In some examples, the feedback transmission procedure 300 may be implement by a network device 105 and one or more UEs 115. The network device 105 and the UE 115 may be examples of a network device 105 and a UE 115, as described with reference to FIGS. 1 and 2.

According to one or more aspects of the present disclosure, a UE 115 may receive control signaling configuring resources for receiving semi-persistent scheduled transmissions 302. As depicted herein, the UE 115 and the network device 105 may be configured to perform transmissions according to semi-persistent scheduling period 1 and semi-persistent scheduling period 2. As depicted herein, the semi-persistent scheduling period 1 may operate according to a first radio allocation format (format 1) and the semi-persistent scheduling period 2 may operate according to a second radio allocation format (format 2). In the depicted example, a semi-persistent scheduling period may have a time duration of one millisecond that includes 112 symbols.

The semi-persistent scheduling period may include eight slots each of 125 microseconds, where each slot may include 14 symbols. The UE 115 may receive a semi-persistent scheduled transmission 302-*a* at the beginning of the semi-persistent scheduling period 1 and may provide a feedback at the uplink control channel 305 instant (e.g., 20 symbols later corresponding to a K1 value). For example, the network device 105 may transmit a semi-persistent scheduled transmission 302-*a* at the first slot of the semi-persistent scheduling period 1. As depicted herein, the format 1 may be an example of a slot format 42 that supports three downlink symbols, three flexible symbols and eight uplink symbols. The UE 115 operating according to the format 1 may transmit the feedback utilizing one of the eight uplink symbols (used for uplink control channel 305 transmission). In the example of FIG. 3, the UE transmits a feedback (e.g., semi-persistent scheduling HARQ ACK or NACK) using a physical uplink control channel instant of an uplink control channel 305.

The UE 115 may then receive a control message indicating a change to a radio allocation format (e.g., from format 1 to format 2). As depicted in the example of FIG. 3, at 310, the UE 115 may receive a format change indication configuring the UE 115 to change to format 2. In some examples, the format 2 may be an example of a slot format 33 that supports nine downlink symbols, three flexible symbols and two uplink symbols. As depicted in the example of FIG. 3, the UE 115 may receive a semi-persistent scheduled transmission 302-*b* at the beginning of the semi-persistent scheduling period 2. For example, the network device 105 may transmit a semi-persistent scheduled transmission 302-*b* at the first slot of the semi-persistent scheduling period 2. The UE 115 may determine that there is a conflict for a downlink transmission 315 symbol period between uplink transmission of feedback for a first semi-persistent scheduled downlink transmission (e.g., semi-persistent scheduled HARQ ACK or NACK) and downlink reception based on the change to the radio allocation format. As depicted in the example of FIG. 3, the UE 115 may determine that the downlink transmission 315 symbol period is a downlink channel symbol period (e.g., configured for downlink transmission) in the second radio allocation format, where a corresponding symbol period in the first radio allocation format was an uplink symbol period. The UE 115 may thus determine that there is a conflict in the downlink transmission 315 symbol period between the transmission of a feedback for the semi-persistent scheduled transmission 302-*b* and the downlink reception due to downlink transmission 315 symbol period being a downlink symbol period in the second radio allocation format.

Upon determining a conflict, the UE 115 may choose to defer the feedback to a later available uplink control channel resource. According to one or more aspects, the UE 115 determine the scheduling conflict at time instant t0. Upon identifying the scheduling conflict between uplink transmission of the feedback information and the downlink reception, the UE 115 may defer the feedback transmission within the feedback deferral window 330. A length of the feedback deferral window 330 may correspond to a given (e.g., maximum) deferral value associated with the feedback information for the semi-persistent scheduled transmission. That is, the UE 115 may attempt to select a first available physical uplink control channel resource before time instant t2 (when the feedback deferral window expires). At time instant t1, the UE 115 may also initiate monitoring for a control message during a first time period based on a scheduling conflict between uplink transmission of the feedback information and a downlink reception at a target slot (e.g., downlink transmission 315 symbol period). In some cases, a monitoring window 335 used by the UE 115 to monitor for a control message may expire at time instant t3. Although depicted as separate time instants, it is to be understood that the monitoring window 335 may span from time instant t0 to time instant t1.

As depicted in the example of FIG. 3, the UE 115 may receive a control message (e.g., downlink control information 325) during the monitoring window 335. The control message may include a control message for a feedback codebook or a control message for one-shot feedback retransmission or a request for HARQ code block retransmission or a request for switching an uplink control channel carrier. In some examples, the control message may request one or more feedback transmission 320 bits. In such cases, the UE 115 may transmit the requested feedback transmission 320 bits in a physical uplink control channel instant. In some examples, if the UE 115 does not receive the control message within the monitoring window (not shown), then the UE 115 may refrain from monitoring for the control message and continue to attempt to select a first available physical uplink control channel resource prior to the time instant t2 (within the feedback deferral window 330). If the UE 115 is unable to find an available physical uplink control channel resource prior to the time instant t2, then the UE 115 may drop the feedback information. In some examples, the UE 115 may transmit a portion of the feedback (e.g., the feedback transmission 320 bits requested by the control message). In such cases, the UE 115 may attempt to transmit the remaining portion of the feedback using an available physical uplink control channel resource prior to the time instant t2.

Figure 4:
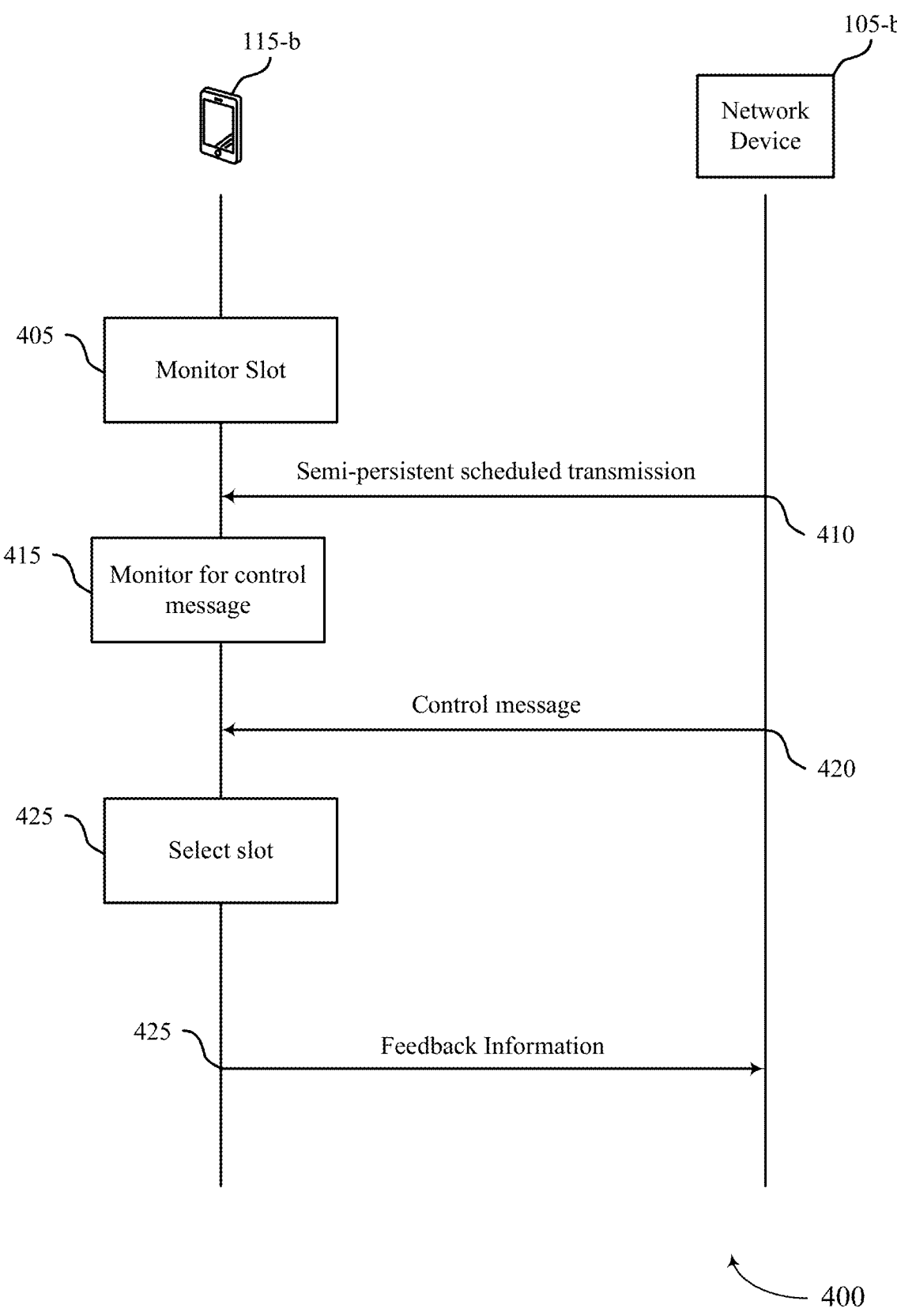
FIG. 4 illustrates an example of a process flow that supports techniques for feedback deferral with feedback retransmission and carrier switching in accordance with aspects of the present disclosure.

FIG. 4 illustrates an example of a process flow 400 that supports techniques for feedback deferral with feedback retransmission and carrier switching in accordance with aspects of the present disclosure. In some examples, the process flow 400 may implement aspects of wireless communications system 100 and the wireless communications system 200 described with reference to FIGS. 1 and 2, respectively. For example, the process flow 400 may be based on one or more rules for deferred feedback transmission in wireless communications systems. The process flow 400 may be implemented by the UE 115-*b* and the network device 105-*b* for reduced power consumption and may promote low latency and low interference for wireless communications supporting high priority channels, among other benefits. The network device 105-*b* and the UE 115-*b* may be examples of a network device 105 and a UE 115, as described with reference to FIGS. 1 and 2.

In the following description of the process flow 400, the operations between the network device 105-*b* and the UE 115-*b* may be transmitted in a different order than the example order shown, or the operations performed by the network device 105-*b* and the UE 115-*b* may be performed in different orders or at different times. Some operations may also be omitted from the process flow 400, and other operations may be added to the process flow 400.

At 405, the UE 115-*b* may monitor a first slot for semi-persistent scheduled transmission associated with a target slot for feedback information for the semi-persistent scheduled transmission. The UE 115-*b* may monitor the first slot based on a reference numerology associated with a serving cell. In some examples, the UE 115-*b* may be configured with multiple serving cells, where each of the multiple serving cells may be associated with a reference numerology.

At 410, the network device 105-*b* may transmit the semi-persistent scheduled transmission to the UE 115-*b* in the first slot. In some examples, the network device 105-*b* may configure the UE 115-*b* to transmit feedback information for the semi-persistent scheduled transmission in a target slot. The UE 115-*b* may identify the target slot based on the first slot and a timing offset (e.g., a delay parameter). The timing offset may indicate a number of slots between the first slot and the target slot. In some examples, the network device 105-*b* may indicate the timing offset to the UE 115-*b* via control signaling. In other examples, the network device 105-*b* may indicate the timing offset to the UE 115-*b* via dynamic signaling.

In some examples, the UE 115-*b* may generate the feedback information for the semi-persistent scheduled transmission. The UE 115-*b* may generate the feedback information based on monitoring the first slot. For example, if the UE 115-*b* successfully receives and decodes the semi-persistent scheduled transmission, the UE 115-*b* may generate ACK feedback for the semi-persistent scheduled transmission. Alternatively, if the UE 115-*b* is unable to receive and decode the semi-persistent scheduled transmission, the UE 115-*b* may generate NACK feedback for the semi-persistent scheduled transmission. In some examples, the UE 115-*b* may identify a scheduling conflict associated with a target slot (e.g., if there are insufficient available uplink resources for the UE 115-*b* to transmit the feedback information in the target slot). In such cases, the UE 115-*b* may scan the remaining slots and may select a subsequent second slot based on the scanning. The UE 115-*b* may also initiate a first timer based on receiving the semi-persistent scheduled transmission.

At 415, the UE 115-*b* may monitor for a control message during a first time period based on a scheduling conflict between uplink transmission of the feedback information and a downlink reception at the target slot. In some examples, the UE 115-*b* may initiate a second timer in response to initiating the first timer. The UE 115-*b* may monitor the control message based on initiating the second timer. At 420, the UE 115-*b* may receive, during a first time period and after initiating the second timer, the control message requesting one or more feedback bits.

At 425, the UE 115-*b* may select a second slot subsequent to the first slot for transmission of the feedback information for the semi-persistent scheduled transmission based on at least one of monitoring for the control message during the first time period or an availability of uplink resources during a second time period at least partially overlapping with the first time period. For example, if the UE 115-*b* determines that there are insufficient available uplink resources for the UE 115-*b* to transmit the feedback information on in the target slot, then the UE 115-*b* may defer transmission of the feedback information to a second slot that has sufficient available uplink resources in the target slot. The UE 115-*b* may attempt to find the second slot based on monitoring for the control message during a first time period and prior to expiration of a maximum deferral time window (e.g., second time period). At 425, the UE 115-*b* may transmit the feedback information to the network device 105-*b* in the second slot.

Aspects of the process flow 400 may enable the UE 115-*b* to transmit the feedback information to the network device 105-*b* with reduced latency, among other benefits. For example, the described techniques may enable the UE 115-*b* to transmit the feedback information using techniques for feedback retransmission (using control message) in conjunction with feedback deferral techniques.

Figure 5:
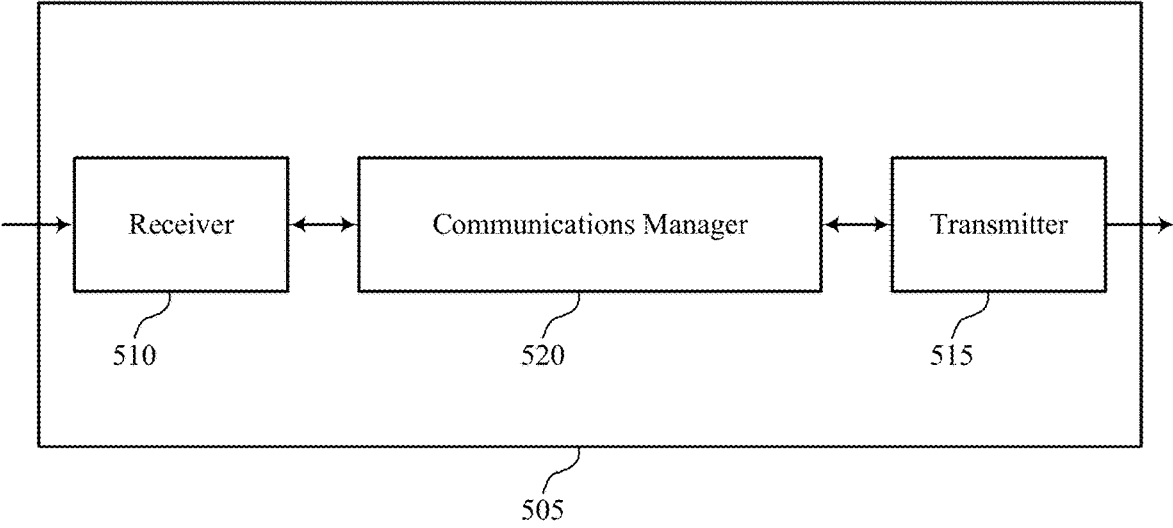
FIGS. 5 and 6 show block diagrams of devices that support techniques for feedback deferral with feedback retransmission and carrier switching in accordance with aspects of the present disclosure.

FIG. 5 shows a block diagram 500 of a device 505 that supports techniques for feedback deferral with feedback retransmission and carrier switching in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for feedback deferral with feedback retransmission and carrier switching). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for feedback deferral with feedback retransmission and carrier switching). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for feedback deferral with feedback retransmission and carrier switching as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE 115 in accordance with examples as disclosed herein. For example, the communications manager 520 may be configured as or otherwise support a means for monitoring a first slot for a semi-persistent scheduled transmission associated with a target slot for feedback information for the semi-persistent scheduled transmission. The communications manager 520 may be configured as or otherwise support a means for monitoring for a control message during a first time period based on a scheduling conflict between uplink transmission of the feedback information and a downlink reception at the target slot. The communications manager 520 may be configured as or otherwise support a means for selecting a second slot subsequent to the first slot for transmission of the feedback information for the semi-persistent scheduled transmission based on at least one of monitoring for the control message during the first time period or an availability of uplink resources during a second time period at least partially overlapping with the first time period. The communications manager 520 may be configured as or otherwise support a means for performing a communication procedure with a network device 105 according to the selection.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
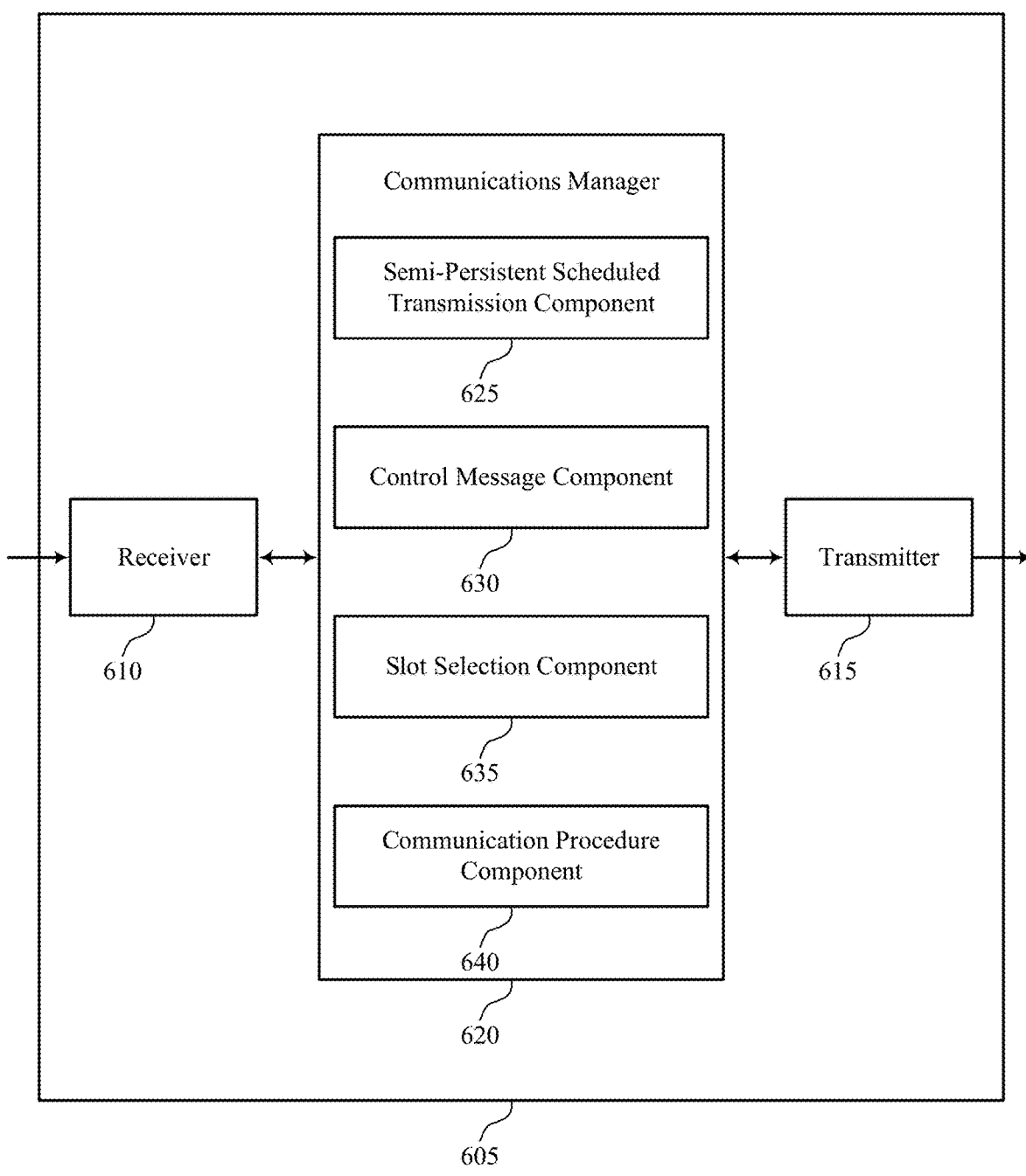

FIG. 6 shows a block diagram 600 of a device 605 that supports techniques for feedback deferral with feedback retransmission and carrier switching in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for feedback deferral with feedback retransmission and carrier switching). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for feedback deferral with feedback retransmission and carrier switching). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for feedback deferral with feedback retransmission and carrier switching as described herein. For example, the communications manager 620 may include a semi-persistent scheduled transmission component 625, a control message component 630, a slot selection component 635, a communication procedure component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The semi-persistent scheduled transmission component 625 may be configured as or otherwise support a means for monitoring a first slot for a semi-persistent scheduled transmission associated with a target slot for feedback information for the semi-persistent scheduled transmission. The control message component 630 may be configured as or otherwise support a means for monitoring for a control message during a first time period based on a scheduling conflict between uplink transmission of the feedback information and a downlink reception at the target slot. The slot selection component 635 may be configured as or otherwise support a means for selecting a second slot subsequent to the first slot for transmission of the feedback information for the semi-persistent scheduled transmission based on at least one of monitoring for the control message during the first time period or an availability of uplink resources during a second time period at least partially overlapping with the first time period. The communication procedure component 640 may be configured as or otherwise support a means for performing a communication procedure with a network device 105 according to the selection.

Figure 7:
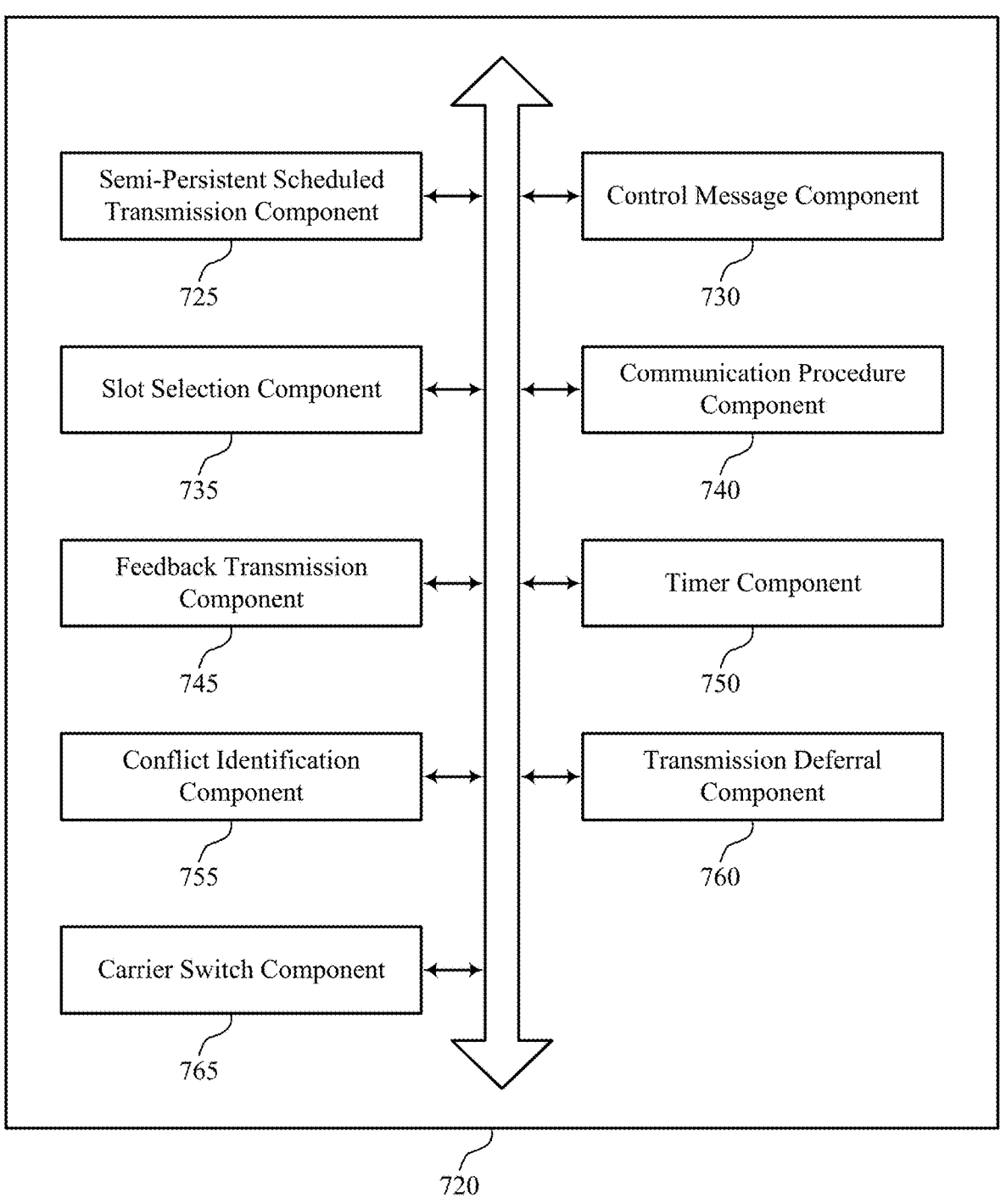
FIG. 7 shows a block diagram of a communications manager that supports techniques for feedback deferral with feedback retransmission and carrier switching in accordance with aspects of the present disclosure.

FIG. 7 shows a block diagram 700 of a communications manager 720 that supports techniques for feedback deferral with feedback retransmission and carrier switching in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for feedback deferral with feedback retransmission and carrier switching as described herein. For example, the communications manager 720 may include a semi-persistent scheduled transmission component 725, a control message component 730, a slot selection component 735, a communication procedure component 740, a feedback transmission component 745, a timer component 750, a conflict identification component 755, a transmission deferral component 760, a carrier switch component 765, or any combination thereof. Each of these components may communicate, directly or indirectly, with one another (e.g., via one or more buses).

The communications manager 720 may support wireless communication at a UE in accordance with examples as disclosed herein. The semi-persistent scheduled transmission component 725 may be configured as or otherwise support a means for monitoring a first slot for a semi-persistent scheduled transmission associated with a target slot for feedback information for the semi-persistent scheduled transmission. The control message component 730 may be configured as or otherwise support a means for monitoring for a control message during a first time period based on a scheduling conflict between uplink transmission of the feedback information and a downlink reception at the target slot. The slot selection component 735 may be configured as or otherwise support a means for selecting a second slot subsequent to the first slot for transmission of the feedback information for the semi-persistent scheduled transmission based on at least one of monitoring for the control message during the first time period or an availability of uplink resources during a second time period at least partially overlapping with the first time period. The communication procedure component 740 may be configured as or otherwise support a means for performing a communication procedure with a network device 105 according to the selection.

In some examples, to support performing the communication procedure, the feedback transmission component 745 may be configured as or otherwise support a means for transmitting, to the network device 105, the feedback information including at least feedback for the semi-persistent scheduled transmission on the second slot according to the selection.

In some examples, the semi-persistent scheduled transmission component 725 may be configured as or otherwise support a means for receiving the semi-persistent scheduled transmission in the first slot. In some examples, the timer component 750 may be configured as or otherwise support a means for initiating a first timer based on receiving the semi-persistent scheduled transmission, where the first timer is configured to expire upon termination of the second time period.

In some examples, the timer component 750 may be configured as or otherwise support a means for initiating a second timer in response to initiating the first timer, where monitoring the control message is based on initiating the second timer.

In some examples, the control message component 730 may be configured as or otherwise support a means for receiving, during the first time period and after initiating the second timer, the control message requesting one or more feedback bits, where selecting the second slot is based on the control message.

In some examples, the feedback transmission component 745 may be configured as or otherwise support a means for transmitting, to the network device 105, one or more requested feedback bits on the second slot in accordance with the selecting. In some examples, the second timer is configured to expire upon termination of the first time period. In some examples, the control message component 730 may be configured as or otherwise support a means for determining that the control message is not received during the first time period.

In some examples, the timer component 750 may be configured as or otherwise support a means for determining a termination of the second time period. In some examples, the communication procedure component 740 may be configured as or otherwise support a means for dropping the feedback information for the semi-persistent scheduled transmission based on determining the termination of the second time period.

In some examples, the conflict identification component 755 may be configured as or otherwise support a means for identifying, during the target slot, the scheduling conflict between uplink transmission of the feedback information and the downlink reception. In some examples, the transmission deferral component 760 may be configured as or otherwise support a means for deferring transmission of the feedback information to the second slot based on identifying the scheduling conflict, where selecting the second slot is based on deferring the transmission.

In some examples, the carrier switch component 765 may be configured as or otherwise support a means for determining that carrier switching is enabled at the UE 115, where selecting the second slot includes selecting the second slot in accordance with an availability of uplink resources on a set of multiple serving cells during the target slot. In some examples, the transmission deferral component 760 may be configured as or otherwise support a means for identifying a maximum deferral value associated with the feedback information for the semi-persistent scheduled transmission, where the second time period is based on the maximum deferral value.

In some examples, the control message includes a control message for a feedback codebook or a control message for one-shot feedback retransmission or a control message for feedback codebook retransmission or a control message for switching an uplink control channel carrier.

Figure 8:
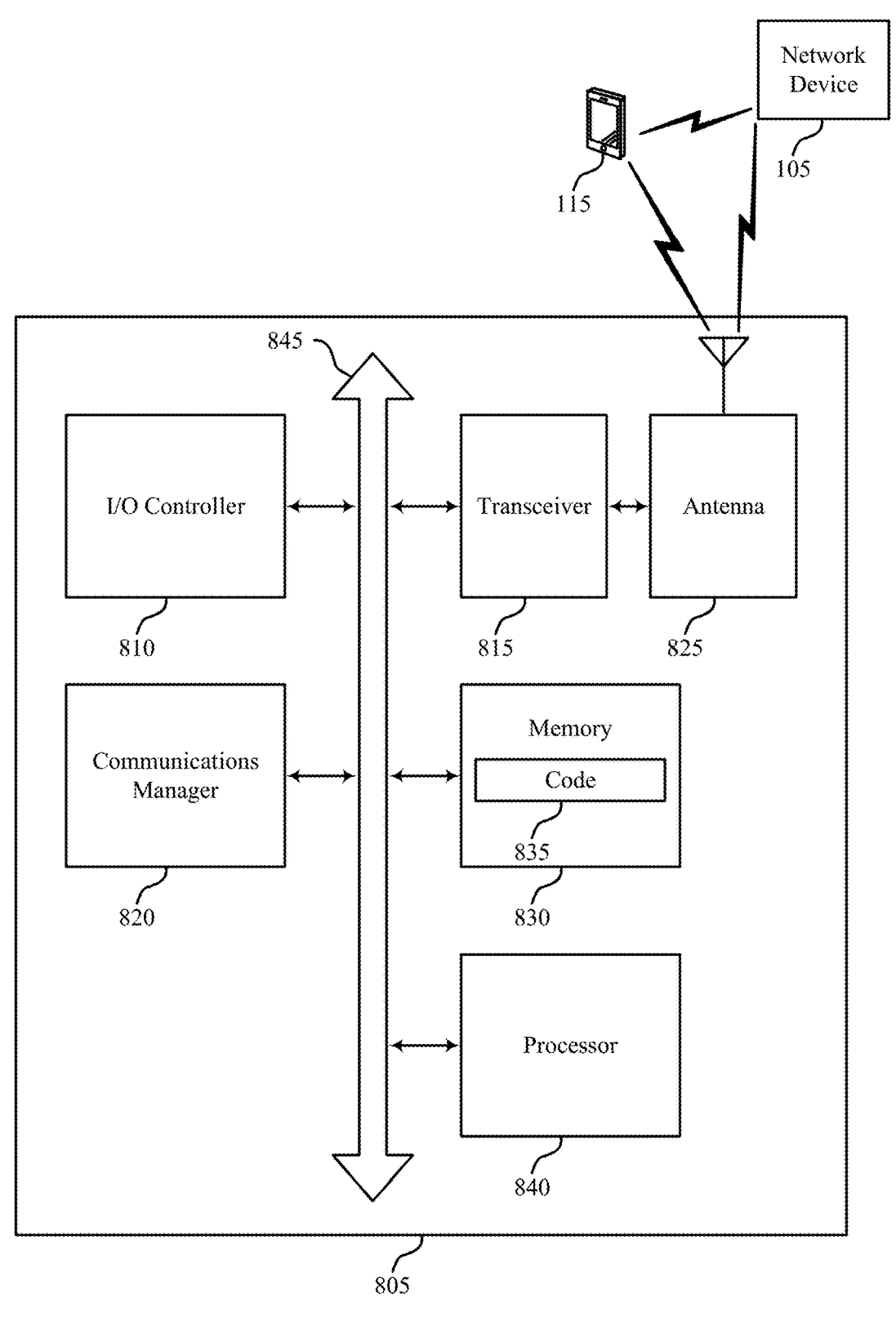
FIG. 8 shows a diagram of a system including a device that supports techniques for feedback deferral with feedback retransmission and carrier switching in accordance with aspects of the present disclosure.

FIG. 8 shows a diagram of a system 800 including a device 805 that supports techniques for feedback deferral with feedback retransmission and carrier switching in accordance with aspects of the present disclosure. The device 805 may be an example of or include the components of a device 505, a device 605, or a UE 115 as described herein. The device 805 may communicate wirelessly with one or more network devices 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for feedback deferral with feedback retransmission and carrier switching). For example, the device 805 or a component of the device 805 may include a processor 840 and memory 830 coupled to the processor 840, the processor 840 and memory 830 configured to perform various functions described herein.

The communications manager 820 may support wireless communication at a UE 115 in accordance with examples as disclosed herein. For example, the communications manager 820 may be configured as or otherwise support a means for monitoring a first slot for a semi-persistent scheduled transmission associated with a target slot for feedback information for the semi-persistent scheduled transmission. The communications manager 820 may be configured as or otherwise support a means for monitoring for a control message during a first time period based on a scheduling conflict between uplink transmission of the feedback information and a downlink reception at the target slot. The communications manager 820 may be configured as or otherwise support a means for selecting a second slot subsequent to the first slot for transmission of the feedback information for the semi-persistent scheduled transmission based on at least one of monitoring for the control message during the first time period or an availability of uplink resources during a second time period at least partially overlapping with the first time period. The communications manager 820 may be configured as or otherwise support a means for performing a communication procedure with a network device 105 according to the selection.

By including or configuring the communications manager 820 in accordance with examples as described herein, the device 805 may support techniques for improved communication reliability, reduced latency, improved user experience related to reduced processing, and more efficient utilization of communication resources, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for feedback deferral with feedback retransmission and carrier switching as described herein, or the processor 840 and the memory 830 may be otherwise configured to perform or support such operations.

FIG. 9 shows a block diagram 900 of a device 905 that supports techniques for feedback deferral with feedback retransmission and carrier switching in accordance with aspects of the present disclosure. The device 905 may be an example of aspects of a network device 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for feedback deferral with feedback retransmission and carrier switching). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for feedback deferral with feedback retransmission and carrier switching). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for feedback deferral with feedback retransmission and carrier switching as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network device 105 in accordance with examples as disclosed herein. For example, the communications manager 920 may be configured as or otherwise support a means for transmitting, to a UE 115 and during a first slot, a semi-persistent scheduled transmission associated with a target slot for feedback information for the semi-persistent scheduled transmission. The communications manager 920 may be configured as or otherwise support a means for transmitting, to the UE 115, a control message during a first time period based on a scheduling conflict between uplink transmission of the feedback information and a downlink reception at the target slot. The communications manager 920 may be configured as or otherwise support a means for receiving, from the UE, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources.

Figure 10:
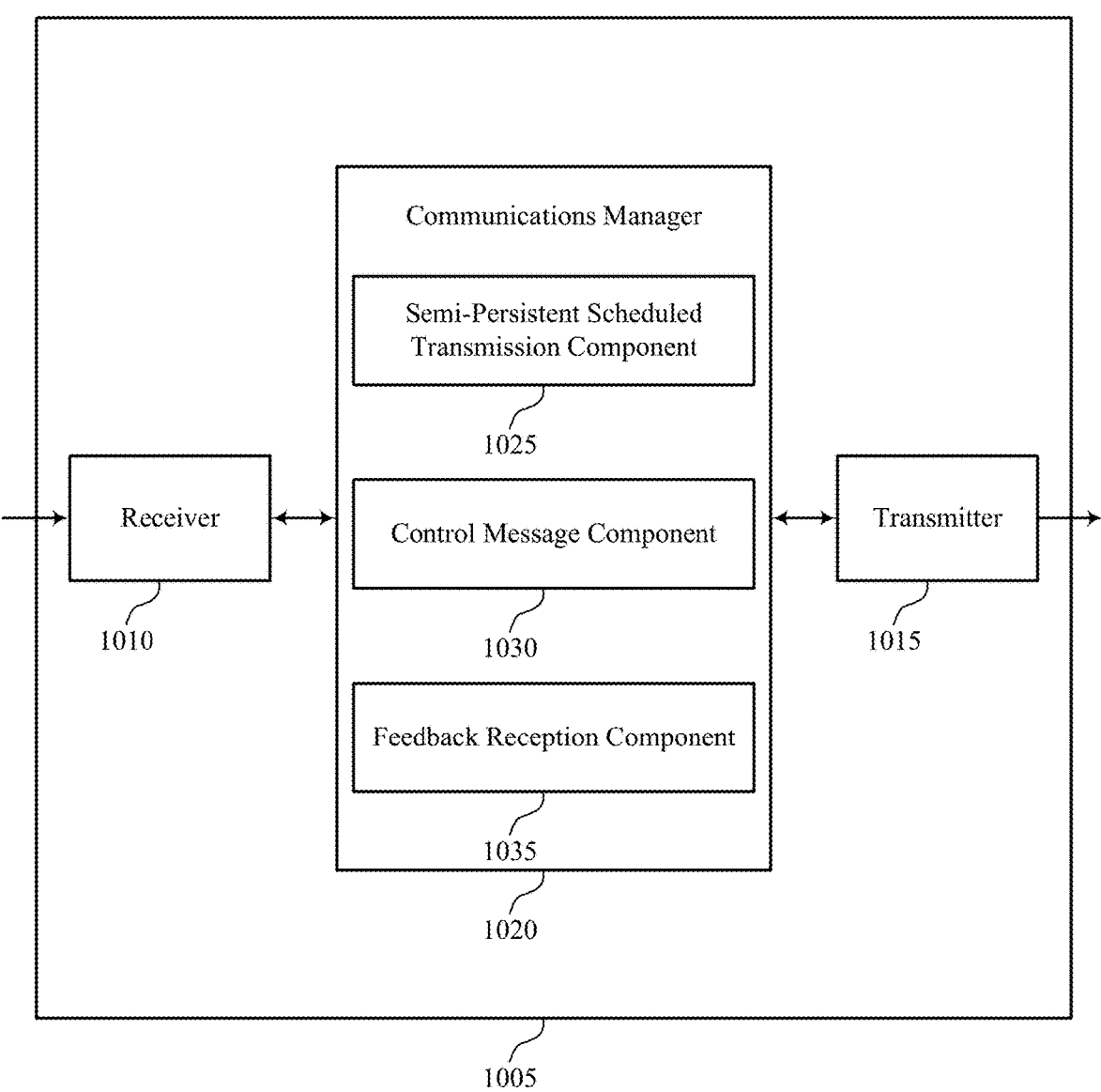

FIG. 10 shows a block diagram 1000 of a device 1005 that supports techniques for feedback deferral with feedback retransmission and carrier switching in accordance with aspects of the present disclosure. The device 1005 may be an example of aspects of a device 905 or a network device 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for feedback deferral with feedback retransmission and carrier switching). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for feedback deferral with feedback retransmission and carrier switching). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for feedback deferral with feedback retransmission and carrier switching as described herein. For example, the communications manager 1020 may include a semi-persistent scheduled transmission component 1025, a control message component 1030, a feedback reception component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network device 105 in accordance with examples as disclosed herein. The semi-persistent scheduled transmission component 1025 may be configured as or otherwise support a means for transmitting, to a UE 115 and during a first slot, a semi-persistent scheduled transmission associated with a target slot for feedback information for the semi-persistent scheduled transmission. The control message component 1030 may be configured as or otherwise support a means for transmitting, to the UE 115, a control message during a first time period based on a scheduling conflict between uplink transmission of the feedback information and a downlink reception at the target slot. The feedback reception component 1035 may be configured as or otherwise support a means for receiving, from the UE 115, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period.

Figure 11:
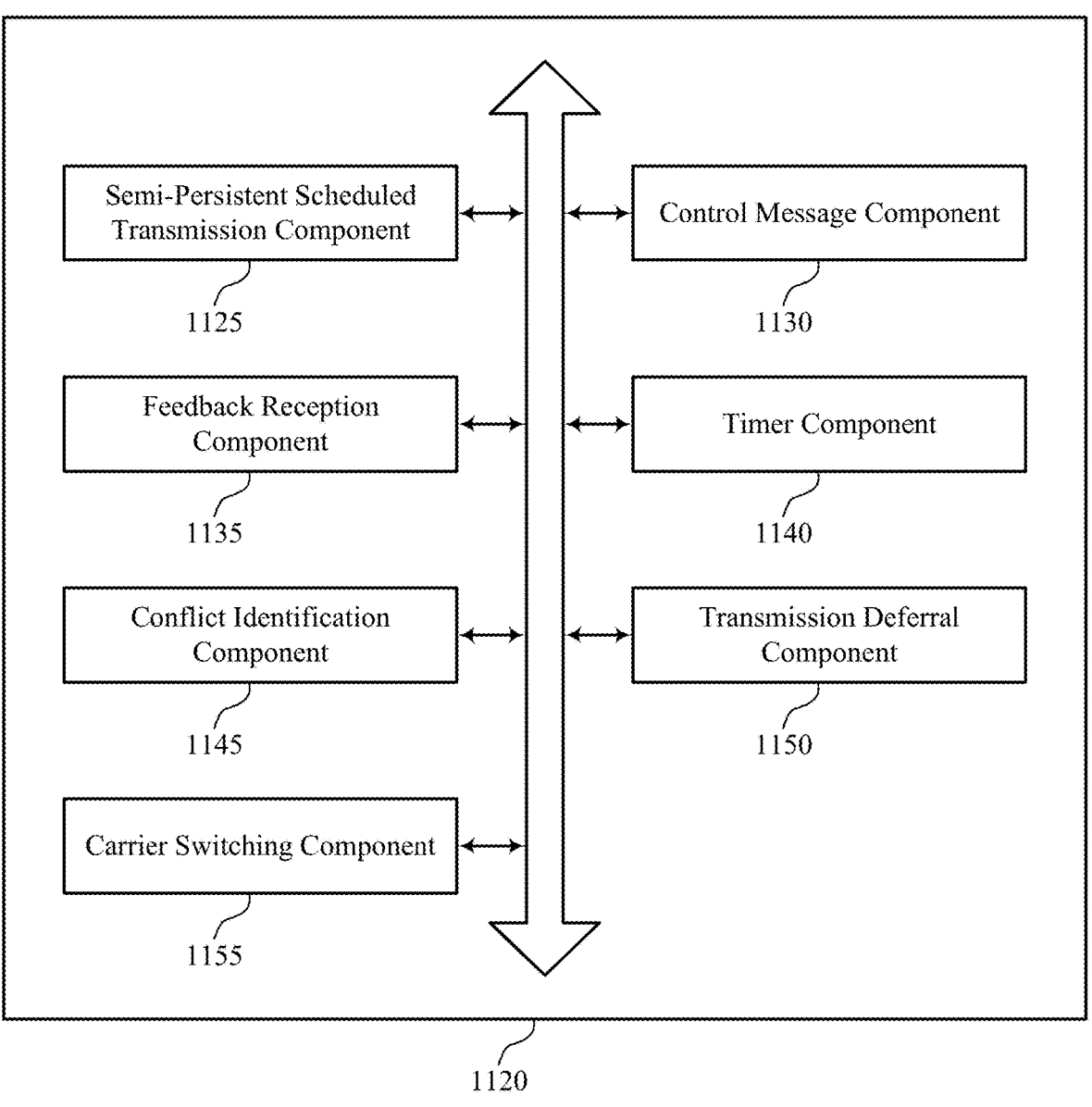
FIG. 11 shows a block diagram of a communications manager that supports techniques for feedback deferral with feedback retransmission and carrier switching in accordance with aspects of the present disclosure.

FIG. 11 shows a block diagram 1100 of a communications manager 1120 that supports techniques for feedback deferral with feedback retransmission and carrier switching in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for feedback deferral with feedback retransmission and carrier switching as described herein. For example, the communications manager 1120 may include a semi-persistent scheduled transmission component 1125, a control message component 1130, a feedback reception component 1135, a timer component 1140, a conflict identification component 1145, a transmission deferral component 1150, a carrier switching component 1155, or any combination thereof. Each of these components may communicate, directly or indirectly, with one another (e.g., via one or more buses).

The communications manager 1120 may support wireless communication at a network device 105 in accordance with examples as disclosed herein. The semi-persistent scheduled transmission component 1125 may be configured as or otherwise support a means for transmitting, to a UE 115 and during a first slot, a semi-persistent scheduled transmission associated with a target slot for feedback information for the semi-persistent scheduled transmission. The control message component 1130 may be configured as or otherwise support a means for transmitting, to the UE 115, a control message during a first time period based on a scheduling conflict between uplink transmission of the feedback information and a downlink reception at the target slot. The feedback reception component 1135 may be configured as or otherwise support a means for receiving, from the UE 115, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period.

In some examples, the timer component 1140 may be configured as or otherwise support a means for configuring the UE 115 to initiate a first timer based on transmitting the semi-persistent scheduled transmission, where the first timer is configured to expire upon termination of the second time period.

In some examples, the timer component 1140 may be configured as or otherwise support a means for configuring the UE 115 to initiate a second timer in response to initiating the first timer, where transmitting the control message is based on initiating the second timer.

In some examples, to support transmitting the control message, the control message component 1130 may be configured as or otherwise support a means for transmitting, during the first time period and after initiating the second timer, the control message requesting one or more feedback bits, where the second slot is selected based on the control message.

In some examples, the feedback reception component 1135 may be configured as or otherwise support a means for receiving, from the UE 115, one or more requested feedback bits on the second slot in accordance with the selecting. In some examples, the second timer is configured to expire upon termination of the first time period.

In some examples, the conflict identification component 1145 may be configured as or otherwise support a means for identifying, during the target slot, the scheduling conflict between uplink transmission of the feedback information and the downlink reception. In some examples, the transmission deferral component 1150 may be configured as or otherwise support a means for configuring the UE 115 to defer transmission of the feedback information to the second slot based on identifying the scheduling conflict, where the second slot is selected based on deferring the transmission.

In some examples, the carrier switching component 1155 may be configured as or otherwise support a means for determining that carrier switching is enabled at the UE 115, where the second slot is selected in accordance with an availability of uplink resources on a set of multiple serving cells during the target slot. In some examples, the transmission deferral component 1150 may be configured as or otherwise support a means for identifying a maximum deferral value associated with the feedback information for the semi-persistent scheduled transmission, where the second time period is based on the maximum deferral value. In some examples, the control message includes a control message for a feedback codebook or a control message for one-shot feedback retransmission or a control message for feedback codebook retransmission or a control message for switching an uplink control channel carrier.

Figure 12:
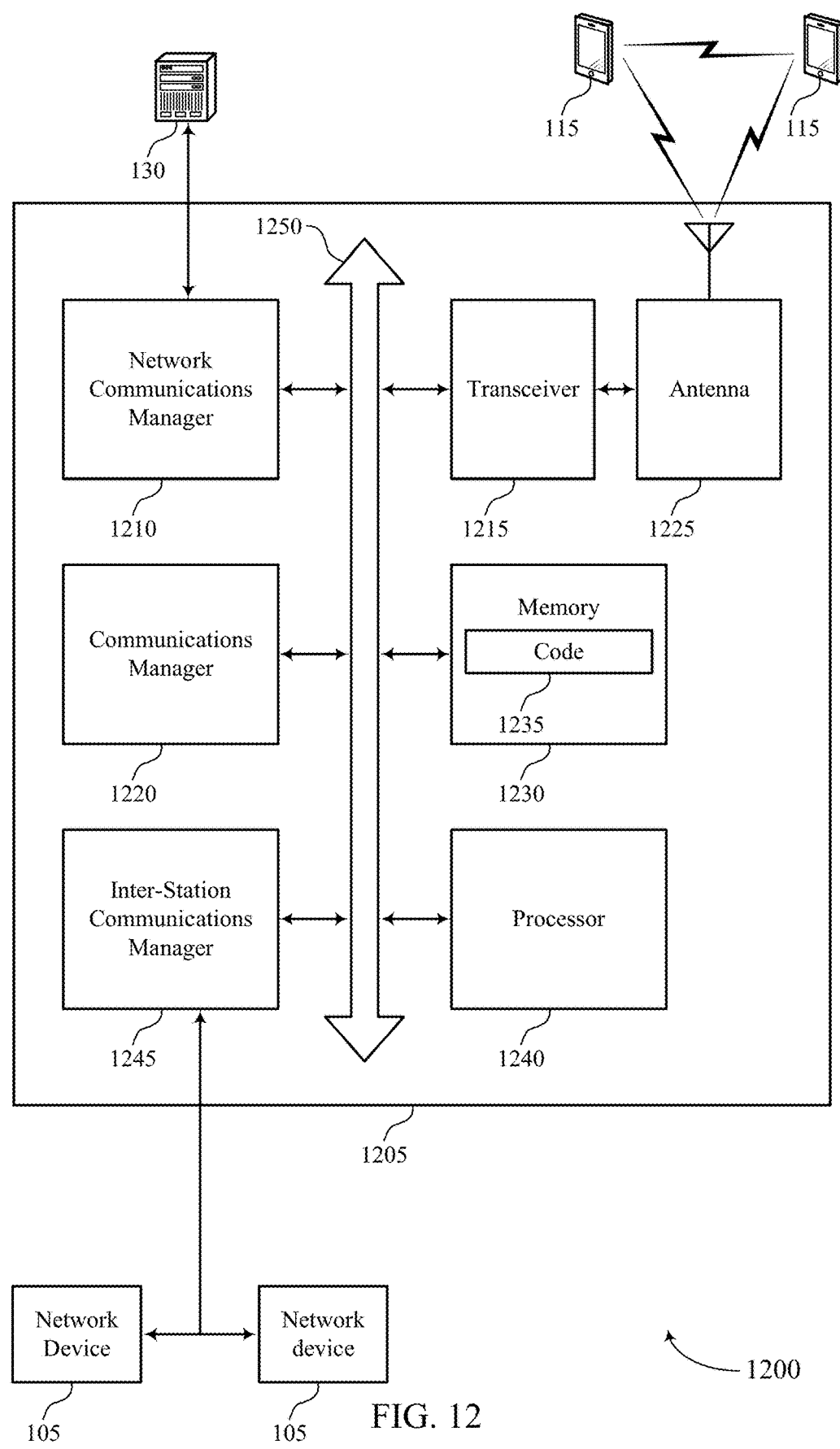
FIG. 12 shows a diagram of a system including a device that supports techniques for feedback deferral with feedback retransmission and carrier switching in accordance with aspects of the present disclosure.

FIG. 12 shows a diagram of a system 1200 including a device 1205 that supports techniques for feedback deferral with feedback retransmission and carrier switching in accordance with aspects of the present disclosure. The device 1205 may be an example of or include the components of a device 905, a device 1005, or a network device 105 as described herein. The device 1205 may communicate wirelessly with one or more network devices 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for feedback deferral with feedback retransmission and carrier switching). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other network devices 105, and may include a controller or scheduler for controlling communications with UEs 115 in cooperation with other network devices 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between network devices 105.

The communications manager 1220 may support wireless communication at a network device 105 in accordance with examples as disclosed herein. For example, the communications manager 1220 may be configured as or otherwise support a means for transmitting, to a UE and during a first slot, a semi-persistent scheduled transmission associated with a target slot for feedback information for the semi-persistent scheduled transmission. The communications manager 1220 may be configured as or otherwise support a means for transmitting, to the UE 115, a control message during a first time period based on a scheduling conflict between uplink transmission of the feedback information and a downlink reception at the target slot. The communications manager 1220 may be configured as or otherwise support a means for receiving, from the UE 115, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period.

By including or configuring the communications manager 1220 in accordance with examples as described herein, the device 1205 may support techniques for improved communication reliability, reduced latency, improved user experience related to reduced processing, and more efficient utilization of communication resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for feedback deferral with feedback retransmission and carrier switching as described herein, or the processor 1240 and the memory 1230 may be otherwise configured to perform or support such operations.

FIG. 13 shows a flowchart illustrating a method 1300 that supports techniques for feedback deferral with feedback retransmission and carrier switching in accordance with aspects of the present disclosure. The operations of the method 1300 may be implemented by a UE 115 or its components as described herein. For example, the operations of the method 1300 may be performed by a UE 115 as described with reference to FIGS. 1 through 8. In some examples, a UE 115 may execute a set of instructions to control the functional elements of the UE to perform the described functions. Additionally or alternatively, the UE 115 may perform aspects of the described functions using special-purpose hardware.

At 1305, the method may include monitoring a first slot for a semi-persistent scheduled transmission associated with a target slot for feedback information for the semi-persistent scheduled transmission. The operations of 1305 may be performed in accordance with examples as disclosed herein. In some examples, aspects of the operations of 1305 may be performed by a semi-persistent scheduled transmission component 725 as described with reference to FIG. 7.

At 1310, the method may include monitoring for a control message during a first time period based on a scheduling conflict between uplink transmission of the feedback information and a downlink reception at the target slot. The operations of 1310 may be performed in accordance with examples as disclosed herein. In some examples, aspects of the operations of 1310 may be performed by a control message component 730 as described with reference to FIG. 7.

At 1315, the method may include selecting a second slot subsequent to the first slot for transmission of the feedback information for the semi-persistent scheduled transmission based on at least one of monitoring for the control message during the first time period or an availability of uplink resources during a second time period at least partially overlapping with the first time period. The operations of 1315 may be performed in accordance with examples as disclosed herein. In some examples, aspects of the operations of 1315 may be performed by a slot selection component 735 as described with reference to FIG. 7.

At 1320, the method may include performing a communication procedure with a network device 105 according to the selection. The operations of 1320 may be performed in accordance with examples as disclosed herein. In some examples, aspects of the operations of 1320 may be performed by a communication procedure component 740 as described with reference to FIG. 7.

Figure 14:
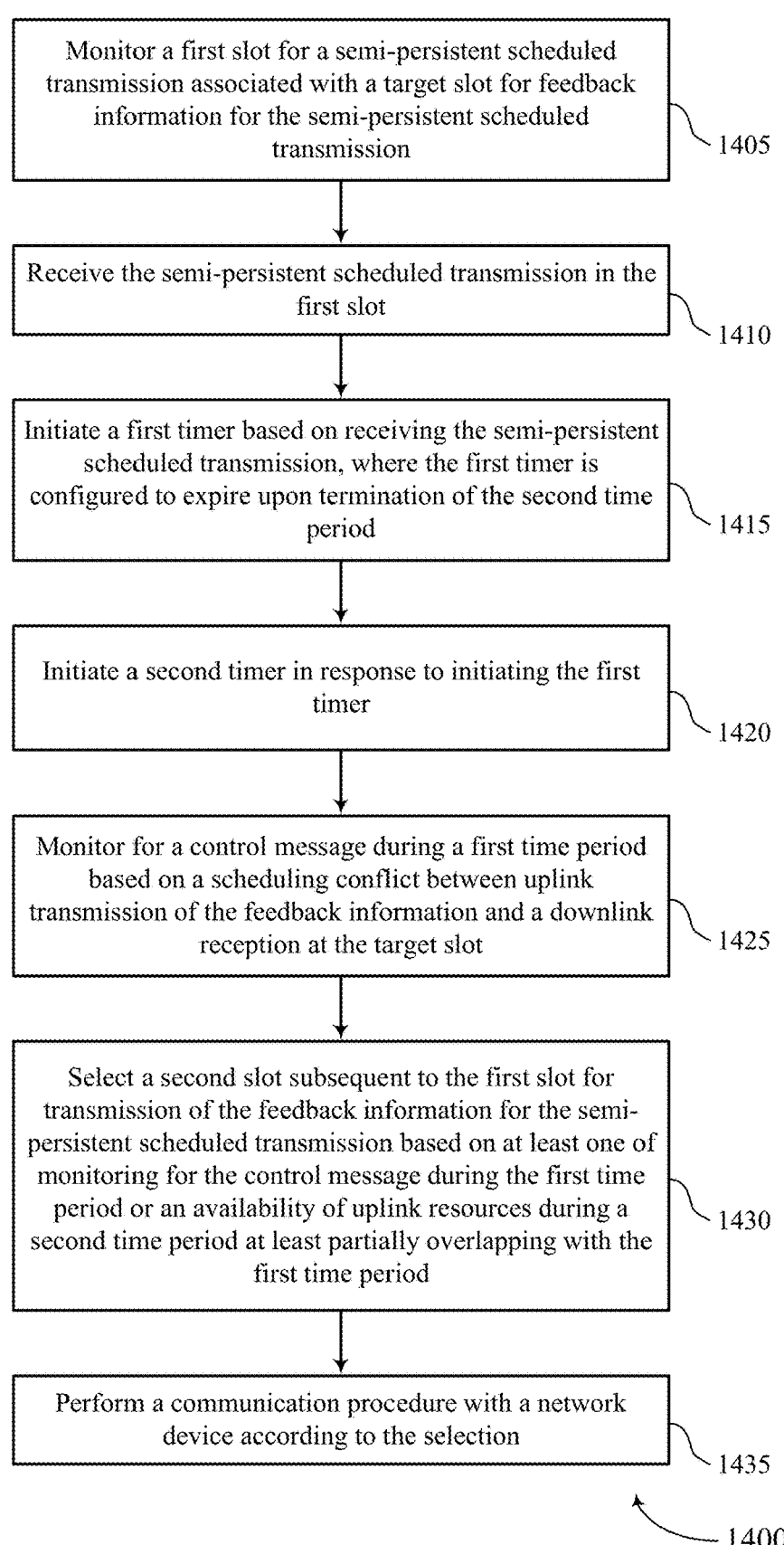

FIG. 14 shows a flowchart illustrating a method 1400 that supports techniques for feedback deferral with feedback retransmission and carrier switching in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE 115 may execute a set of instructions to control the functional elements of the UE 115 to perform the described functions. Additionally or alternatively, the UE 115 may perform aspects of the described functions using special-purpose hardware.

At 1405, the method may include monitoring a first slot for a semi-persistent scheduled transmission associated with a target slot for feedback information for the semi-persistent scheduled transmission. The operations of 1405 may be performed in accordance with examples as disclosed herein. In some examples, aspects of the operations of 1405 may be performed by a semi-persistent scheduled transmission component 725 as described with reference to FIG. 7.

At 1410, the method may include receiving the semi-persistent scheduled transmission in the first slot. The operations of 1410 may be performed in accordance with examples as disclosed herein. In some examples, aspects of the operations of 1410 may be performed by a semi-persistent scheduled transmission component 725 as described with reference to FIG. 7.

At 1415, the method may include initiating a first timer based on receiving the semi-persistent scheduled transmission, where the first timer is configured to expire upon termination of the second time period. The operations of 1415 may be performed in accordance with examples as disclosed herein. In some examples, aspects of the operations of 1415 may be performed by a timer component 750 as described with reference to FIG. 7.

At 1420, the method may include initiating a second timer in response to initiating the first timer. The operations of 1420 may be performed in accordance with examples as disclosed herein. In some examples, aspects of the operations of 1420 may be performed by a timer component 750 as described with reference to FIG. 7.

At 1425, the method may include monitoring for a control message during a first time period based on a scheduling conflict between uplink transmission of the feedback information and a downlink reception at the target slot. In some example, monitoring the control message is based on initiating the second timer. The operations of 1425 may be performed in accordance with examples as disclosed herein. In some examples, aspects of the operations of 1425 may be performed by a control message component 730 as described with reference to FIG. 7.

At 1430, the method may include selecting a second slot subsequent to the first slot for transmission of the feedback information for the semi-persistent scheduled transmission based on at least one of monitoring for the control message during the first time period or an availability of uplink resources during a second time period at least partially overlapping with the first time period. The operations of 1430 may be performed in accordance with examples as disclosed herein. In some examples, aspects of the operations of 1430 may be performed by a slot selection component 735 as described with reference to FIG. 7.

At 1435, the method may include performing a communication procedure with a network device 105 according to the selection. The operations of 1435 may be performed in accordance with examples as disclosed herein. In some examples, aspects of the operations of 1435 may be performed by a communication procedure component 740 as described with reference to FIG. 7.

Figure 15:
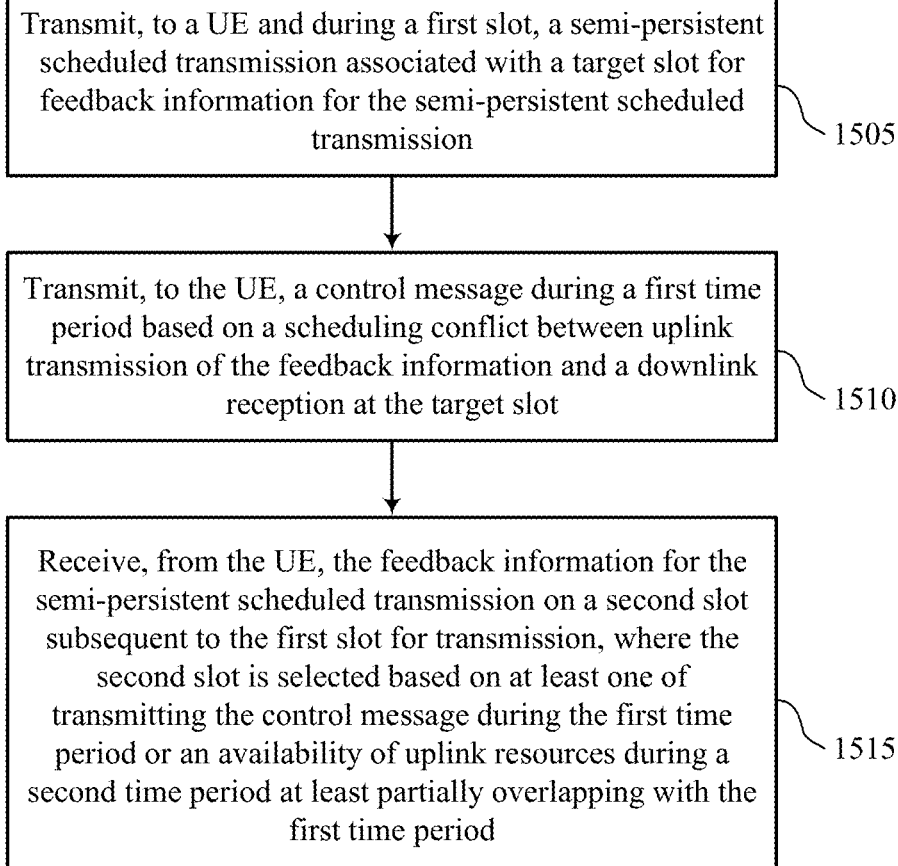

FIG. 15 shows a flowchart illustrating a method 1500 that supports techniques for feedback deferral with feedback retransmission and carrier switching in accordance with aspects of the present disclosure. The operations of the method 1500 may be implemented by a network device 105 or its components as described herein. For example, the operations of the method 1500 may be performed by a network device 105 as described with reference to FIGS. 1 through 4 and 9 through 12. In some examples, a network device 105 may execute a set of instructions to control the functional elements of the network device 105 to perform the described functions. Additionally or alternatively, the network device 105 may perform aspects of the described functions using special-purpose hardware.

At 1505, the method may include transmitting, to a UE 115 and during a first slot, a semi-persistent scheduled transmission associated with a target slot for feedback information for the semi-persistent scheduled transmission. The operations of 1505 may be performed in accordance with examples as disclosed herein. In some examples, aspects of the operations of 1505 may be performed by a semi-persistent scheduled transmission component 1125 as described with reference to FIG. 11.

At 1510, the method may include transmitting, to the UE 115, a control message during a first time period based on a scheduling conflict between uplink transmission of the feedback information and a downlink reception at the target slot. The operations of 1510 may be performed in accordance with examples as disclosed herein. In some examples, aspects of the operations of 1510 may be performed by a control message component 1130 as described with reference to FIG. 11.

At 1515, the method may include receiving, from the UE 115, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period. The operations of 1515 may be performed in accordance with examples as disclosed herein. In some examples, aspects of the operations of 1515 may be performed by a feedback reception component 1135 as described with reference to FIG. 11.

FIG. 16 shows a flowchart illustrating a method 1600 that supports techniques for feedback deferral with feedback retransmission and carrier switching in accordance with aspects of the present disclosure. The operations of the method 1600 may be implemented by a network device 105 or its components as described herein. For example, the operations of the method 1600 may be performed by a network device 105 as described with reference to FIGS. 1 through 4 and 9 through 12. In some examples, a network device 105 may execute a set of instructions to control the functional elements of the network device 105 to perform the described functions. Additionally or alternatively, the network device 105 may perform aspects of the described functions using special-purpose hardware.

At 1605, the method may include transmitting, to a UE 115 and during a first slot, a semi-persistent scheduled transmission associated with a target slot for feedback information for the semi-persistent scheduled transmission. The operations of 1605 may be performed in accordance with examples as disclosed herein. In some examples, aspects of the operations of 1605 may be performed by a semi-persistent scheduled transmission component 1125 as described with reference to FIG. 11.

At 1610, the method may include identifying, during the target slot, the scheduling conflict between uplink transmission of the feedback information and a downlink reception. The operations of 1610 may be performed in accordance with examples as disclosed herein. In some examples, aspects of the operations of 1610 may be performed by a conflict identification component 1145 as described with reference to FIG. 11.

At 1615, the method may include configuring the UE 115 to defer transmission of the feedback information to the second slot based on identifying the scheduling conflict. The operations of 1615 may be performed in accordance with examples as disclosed herein. In some examples, aspects of the operations of 1615 may be performed by a transmission deferral component 1150 as described with reference to FIG. 11.

At 1620, the method may include transmitting, to the UE 115, a control message during a first time period based on the scheduling conflict between uplink transmission of the feedback information and the downlink reception at the target slot. The operations of 1620 may be performed in accordance with examples as disclosed herein. In some examples, aspects of the operations of 1620 may be performed by a control message component 1130 as described with reference to FIG. 11.

At 1625, the method may include receiving, from the UE 115, the feedback information for the semi-persistent scheduled transmission on a second slot subsequent to the first slot for transmission, where the second slot is selected based on at least one of transmitting the control message during the first time period or an availability of uplink resources during a second time period at least partially overlapping with the first time period. In some examples, the second slot is selected based on deferring the transmission. The operations of 1625 may be performed in accordance with examples as disclosed herein. In some examples, aspects of the operations of 1625 may be performed by a feedback reception component 1135 as described with reference to FIG. 11.

The following provides an overview of aspects of the present disclosure:

Aspect 1: A method for wireless communication at a UE, comprising: monitoring a first slot for a semi-persistent scheduled transmission associated with a target slot for feedback information for the semi-persistent scheduled transmission; monitoring for a control message during a first time period based at least in part on a scheduling conflict between uplink transmission of the feedback information and a downlink reception at the target slot; selecting a second slot subsequent to the first slot for transmission of the feedback information for the semi-persistent scheduled transmission based at least in part on at least one of monitoring for the control message during the first time period or an availability of uplink resources during a second time period at least partially overlapping with the first time period; and performing a communication procedure with a network device according to the selection.

Aspect 2: The method of aspect 1, wherein performing the communication procedure further comprises: transmitting, to the network device, the feedback information comprising at least feedback for the semi-persistent scheduled transmission on the second slot according to the selection.

Aspect 3: The method of any of aspects 1 through 2, further comprising: receiving the semi-persistent scheduled transmission in the first slot; and initiating a first timer based at least in part on receiving the semi-persistent scheduled transmission, wherein the first timer is configured to expire upon termination of the second time period.

Aspect 4: The method of aspect 3, further comprising: initiating a second timer in response to initiating the first timer, wherein monitoring the control message is based at least in part on initiating the second timer.

Aspect 5: The method of aspect 4, further comprising: receiving, during the first time period and after initiating the second timer, the control message requesting one or more feedback bits, wherein selecting the second slot is based at least in part on the control message.

Aspect 6: The method of aspect 5, further comprising: transmitting, to the network device, one or more requested feedback bits on the second slot in accordance with the selecting.

Aspect 7: The method of any of aspects 4 through 6, wherein the second timer is configured to expire upon termination of the first time period.

Aspect 8: The method of any of aspects 1 through 7, further comprising: determining that the control message is not received during the first time period.

Aspect 9: The method of any of aspects 1 through 8, further comprising: determining a termination of the second time period; and dropping the feedback information for the semi-persistent scheduled transmission based at least in part on determining the termination of the second time period.

Aspect 10: The method of any of aspects 1 through 9, further comprising: identifying, during the target slot, the scheduling conflict between uplink transmission of the feedback information and the downlink reception; and deferring transmission of the feedback information to the second slot based at least in part on identifying the scheduling conflict, wherein selecting the second slot is based at least in part on deferring the transmission.

Aspect 11: The method of any of aspects 1 through 10, further comprising: determining that carrier switching is enabled at the UE, wherein selecting the second slot comprises selecting the second slot in accordance with an availability of uplink resources on a plurality of serving cells during the target slot.

Aspect 12: The method of any of aspects 1 through 11, further comprising: identifying a maximum deferral value associated with the feedback information for the semi-persistent scheduled transmission, wherein the second time period is based at least in part on the maximum deferral value.

Aspect 13: The method of any of aspects 1 through 12, wherein the control message comprises a control message for a feedback codebook or a control message for one-shot feedback retransmission or a control message for feedback codebook retransmission or a control message for switching an uplink control channel carrier.

Aspect 14: A method for wireless communication at a network device, comprising: transmitting, to a UE and during a first slot, a semi-persistent scheduled transmission associated with a target slot for feedback information for the semi-persistent scheduled transmission; transmitting, to the UE, a control message during a first time period based at least in part on a scheduling conflict between uplink transmission of the feedback information and a downlink reception at the target slot; and receiving, from the UE, the feedback information for the semi-persistent scheduled transmission on a second slot subsequent to the first slot for transmission, wherein the second slot is selected based at least in part on at least one of transmitting the control message during the first time period or an availability of uplink resources during a second time period at least partially overlapping with the first time period.

Aspect 15: The method of aspect 14, further comprising: configuring the UE to initiate a first timer based at least in part on transmitting the semi-persistent scheduled transmission, wherein the first timer is configured to expire upon termination of the second time period.

Aspect 16: The method of aspect 15, further comprising: configuring the UE to initiate a second timer in response to initiating the first timer, wherein transmitting the control message is based at least in part on initiating the second timer.

Aspect 17: The method of aspect 16, wherein transmitting the control message further comprises: transmitting, during the first time period and after initiating the second timer, the control message requesting one or more feedback bits, wherein the second slot is selected based at least in part on the control message.

Aspect 18: The method of aspect 17, further comprising: receiving, from the UE, one or more requested feedback bits on the second slot in accordance with the selecting.

Aspect 19: The method of any of aspects 16 through 18, wherein the second timer is configured to expire upon termination of the first time period.

Aspect 20: The method of any of aspects 14 through 19, further comprising: identifying, during the target slot, the scheduling conflict between uplink transmission of the feedback information and the downlink reception; and configuring the UE to defer transmission of the feedback information to the second slot based at least in part on identifying the scheduling conflict, wherein the second slot is selected based at least in part on deferring the transmission.

Aspect 21: The method of any of aspects 14 through 20, further comprising: determining that carrier switching is enabled at the UE, wherein the second slot is selected in accordance with an availability of uplink resources on a plurality of serving cells during the target slot.

Aspect 22: The method of any of aspects 14 through 21, further comprising: identifying a maximum deferral value associated with the feedback information for the semi-persistent scheduled transmission, wherein the second time period is based at least in part on the maximum deferral value.

Aspect 23: The method of any of aspects 14 through 22, wherein the control message comprises a control message for a feedback codebook or a control message for one-shot feedback retransmission, or both.

Aspect 24: An apparatus for wireless communication at a UE, comprising a processor; and a memory coupled with the processor wherein the memory comprises instructions executable by the processor to cause the apparatus to perform a method of any of aspects 1 through 13.

Aspect 25: An apparatus for wireless communication at a UE, comprising at least one means for performing a method of any of aspects 1 through 13.

Aspect 26: A non-transitory computer-readable medium storing code for wireless communication at a UE, the code comprising instructions executable by a processor to perform a method of any of aspects 1 through 13.

Aspect 27: An apparatus for wireless communication at a network device, comprising a processor; and a memory coupled with the processor wherein the memory comprises instructions executable by the processor to cause the apparatus to perform a method of any of aspects 14 through 23.

Aspect 28: An apparatus for wireless communication at a network device, comprising at least one means for performing a method of any of aspects 14 through 23.

Aspect 29: A non-transitory computer-readable medium storing code for wireless communication at a network device, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor; and
   a memory coupled with the processor, wherein the memory comprises instructions executable by the processor to cause the apparatus to:
      monitor a first slot for a semi-persistent scheduled transmission associated with a target slot for feedback information for the semi-persistent scheduled transmission;
      receive the semi-persistent scheduled transmission in the first slot;
      initiate a first timer based at least in part on receiving the semi-persistent scheduled transmission;
      initiate a second timer in response to initiating the first timer;
      monitor for a control message during a first time period based at least in part on a scheduling conflict between uplink transmission of the feedback information and a downlink reception at the target slot, wherein monitoring the control message is based at least in part on initiating the second timer;
      select a second slot subsequent to the first slot for transmission of the feedback information for the semi-persistent scheduled transmission based at least in part on at least one of monitoring for the control message during the first time period or an availability of uplink resources during a second time period at least partially overlapping with the first time period, wherein the first timer is configured to expire upon termination of the second time period; and
      perform a communication procedure with a network device according to the selection.

2. The apparatus of claim 1, wherein the instructions to perform the communication procedure are further executable by the processor to cause the apparatus to:
   transmit, to the network device, the feedback information comprising at least feedback for the semi-persistent scheduled transmission on the second slot according to the selection.

3. The apparatus of claim 1, wherein the instructions are further executable by the processor to cause the apparatus to:
   receive, during the first time period and after initiating the second timer, the control message requesting one or more feedback bits, wherein selecting the second slot is based at least in part on the control message.

4. The apparatus of claim 3, wherein the instructions are further executable by the processor to cause the apparatus to:
   transmit, to the network device, one or more requested feedback bits on the second slot in accordance with the selecting.

5. An apparatus for wireless communication at a network device, comprising:
   a processor; and
   a memory coupled with the processor, wherein the memory comprises instructions executable by the processor to cause the apparatus to:
      transmit, to a user equipment (UE) and during a first slot, a semi-persistent scheduled transmission associated with a target slot for feedback information for the semi-persistent scheduled transmission;

configure the UE to initiate a first timer based at least in part on transmitting the semi-persistent scheduled transmission;
      configure the UE to initiate a second timer in response to initiating the first timer;
      transmit, to the UE, a control message during a first time period based at least in part on a scheduling conflict between uplink transmission of the feedback information and a downlink reception at the target slot, wherein transmitting the control message is based at least in part on initiating the second timer; and
      receive, from the UE, the feedback information for the semi-persistent scheduled transmission on a second slot subsequent to the first slot for transmission, wherein the second slot is selected based at least in part on at least one of transmitting the control message during the first time period or an availability of uplink resources during a second time period at least partially overlapping with the first time period, wherein the first timer is configured to expire upon termination of the second time period.

6. A method for wireless communication at a user equipment (UE), comprising:
   monitoring a first slot for a semi-persistent scheduled transmission associated with a target slot for feedback information for the semi-persistent scheduled transmission;
   receiving the semi-persistent scheduled transmission in the first slot;
   initiating a first timer based at least in part on receiving the semi-persistent scheduled transmission;
   initiating a second timer in response to initiating the first timer;
   monitoring for a control message during a first time period based at least in part on a scheduling conflict between uplink transmission of the feedback information and a downlink reception at the target slot, wherein monitoring the control message is based at least in part on initiating the second timer;
   selecting a second slot subsequent to the first slot for transmission of the feedback information for the semi-persistent scheduled transmission based at least in part on at least one of monitoring for the control message during the first time period or an availability of uplink resources during a second time period at least partially overlapping with the first time period, wherein the first timer is configured to expire upon termination of the second time period; and
   performing a communication procedure with a network device according to the selection.

7. The method of claim 6, wherein performing the communication procedure further comprises:
   transmitting, to the network device, the feedback information comprising at least feedback for the semi-persistent scheduled transmission on the second slot according to the selection.

8. The method of claim 6, further comprising:
   receiving, during the first time period and after initiating the second timer, the control message requesting one or more feedback bits, wherein selecting the second slot is based at least in part on the control message.

9. The method of claim 8, further comprising:
   transmitting, to the network device, one or more requested feedback bits on the second slot in accordance with the selecting.

10. The method of claim 6, wherein the second timer is configured to expire upon termination of the first time period.

11. The method of claim 6, further comprising:

determining that the control message is not received during the first time period.

12. The method of claim 6, further comprising:

determining a termination of the second time period; and dropping the feedback information for the semi-persistent scheduled transmission based at least in part on determining the termination of the second time period.

13. The method of claim 6, further comprising:

identifying, during the target slot, the scheduling conflict between uplink transmission of the feedback information and the downlink reception; and deferring transmission of the feedback information to the second slot based at least in part on identifying the scheduling conflict, wherein selecting the second slot is based at least in part on deferring the transmission.

14. The method of claim 6, further comprising:

determining that carrier switching is enabled at the UE, wherein selecting the second slot comprises selecting the second slot in accordance with an availability of uplink resources on a plurality of serving cells during the target slot.

15. The method of claim 6, further comprising:

identifying a maximum deferral value associated with the feedback information for the semi-persistent scheduled transmission, wherein the second time period is based at least in part on the maximum deferral value.

16. The method of claim 6, wherein the control message comprises a control message for a feedback codebook or a control message for one-shot feedback retransmission or a control message for feedback codebook retransmission or a control message for switching an uplink control channel carrier.

17. A method for wireless communication at a network device, comprising:

transmitting, to a user equipment (UE) and during a first slot, a semi-persistent scheduled transmission associated with a target slot for feedback information for the semi-persistent scheduled transmission;

configuring the UE to initiate a first timer based at least in part on transmitting the semi-persistent scheduled transmission;

configuring the UE to initiate a second timer in response to initiating the first timer;

transmitting, to the UE, a control message during a first time period based at least in part on a scheduling conflict between uplink transmission of the feedback information and a downlink reception at the target slot, wherein transmitting the control message is based at least in part on initiating the second timer; and receiving, from the UE, the feedback information for the semi-persistent scheduled transmission on a second slot subsequent to the first slot for transmission, wherein the second slot is selected based at least in part on at least one of transmitting the control message during the first time period or an availability of uplink resources during a second time period at least partially overlapping with the first time period, wherein the first timer is configured to expire upon termination of the second time period.

18. The method of claim 17, wherein transmitting the control message further comprises:

transmitting, during the first time period and after initiating the second timer, the control message requesting one or more feedback bits, wherein the second slot is selected based at least in part on the control message.

19. The method of claim 18, further comprising:

receiving, from the UE, one or more requested feedback bits on the second slot in accordance with the selecting.

20. The method of claim 17, wherein the second timer is configured to expire upon termination of the first time period.

21. The method of claim 17, further comprising:

identifying, during the target slot, the scheduling conflict between uplink transmission of the feedback information and the downlink reception; and configuring the UE to defer transmission of the feedback information to the second slot based at least in part on identifying the scheduling conflict, wherein the second slot is selected based at least in part on deferring the transmission.

22. The method of claim 17, further comprising:

determining that carrier switching is enabled at the UE, wherein the second slot is selected in accordance with an availability of uplink resources on a plurality of serving cells during the target slot.

23. The method of claim 17, further comprising:

identifying a maximum deferral value associated with the feedback information for the semi-persistent scheduled transmission, wherein the second time period is based at least in part on the maximum deferral value.

24. The method of claim 17, wherein the control message comprises a control message for a feedback codebook or a control message for one-shot feedback retransmission or a control message for feedback codebook retransmission or a control message for switching an uplink control channel carrier.

* * * * *